US010652105B2

(12) United States Patent
Lim

(10) Patent No.: US 10,652,105 B2
(45) Date of Patent: May 12, 2020

(54) DISPLAY APPARATUS AND CONTROLLING METHOD THEREOF

(71) Applicant: Samsung Electronics Co., Ltd., Suwon-si, Gyeonggi-do (KR)

(72) Inventor: Kyung-soo Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 675 days.

(21) Appl. No.: 14/445,767

(22) Filed: Jul. 29, 2014

(65) Prior Publication Data
US 2015/0082182 A1    Mar. 19, 2015

(30) Foreign Application Priority Data

Sep. 16, 2013   (KR) .................. 10-2013-0110928

(51) Int. Cl.
| | |
|---|---|
| *G06F 17/00* | (2019.01) |
| *H04L 12/24* | (2006.01) |
| *G06F 16/901* | (2019.01) |
| *G06F 3/0482* | (2013.01) |
| *G06F 3/0484* | (2013.01) |

(52) U.S. Cl.
CPC ............ *H04L 41/22* (2013.01); *G06F 3/0482* (2013.01); *G06F 3/04842* (2013.01); *G06F 16/9027* (2019.01)

(58) Field of Classification Search
CPC ................................ G06F 3/0482; H04L 1/22
USPC ................... 715/738, 810, 825, 841
See application file for complete search history.

(56) References Cited

U.S. PATENT DOCUMENTS

| | | | |
|---|---|---|---|
| 9,032,334 B2* | 5/2015 | Yu ........................... | G06F 3/017 715/849 |
| 9,405,452 B2* | 8/2016 | Min ...................... | G06F 3/0482 |
| 9,529,520 B2* | 12/2016 | Cha ....................... | G06F 3/0488 |
| 9,678,622 B2* | 6/2017 | Lim .................... | G06F 3/04817 |
| 10,289,298 B2* | 5/2019 | Hyun ................... | G06F 3/0486 |
| 2007/0198928 A1 | 8/2007 | Tseng | |
| 2008/0134086 A1 | 6/2008 | Liao et al. | |
| 2008/0155428 A1* | 6/2008 | Lee ....................... | G06F 3/0482 715/745 |
| 2010/0070928 A1* | 3/2010 | Goodger ........... | G06F 17/30905 715/838 |
| 2010/0082634 A1* | 4/2010 | Leban ............... | G06F 17/30991 707/741 |
| 2011/0167350 A1* | 7/2011 | Hoellwarth ........... | G06F 3/0483 715/727 |

(Continued)

*Primary Examiner* — Stephen S Hong
*Assistant Examiner* — Matthew J Ludwig
(74) *Attorney, Agent, or Firm* — Jefferson IP Law, LLP

(57) ABSTRACT

A display apparatus is provided. The display apparatus includes a display configured to display at least one of a first Graphic User Interface (GUI) representing a domain which provides an execution screen according to a depth, a user interface configured to receive a user command, and a controller configured to, when one of the at least one of the first GUI is selected according to the user command, display at least one of a second GUI representing a sub domain which is available in a domain represented by the selected first GUI, and when one of the at least one of the second GUI is selected, provide an execution screen corresponding to the sub domain based on sub domain information which is mapped with the selected second GUI.

15 Claims, 44 Drawing Sheets

(56) References Cited

U.S. PATENT DOCUMENTS

| | | | |
|---|---|---|---|
| 2011/0191314 A1* | 8/2011 | Howes | G06F 17/30864 707/706 |
| 2011/0202868 A1* | 8/2011 | Yang | G06F 3/0481 715/781 |
| 2013/0097519 A1* | 4/2013 | Andersson | G06F 9/4443 715/744 |

* cited by examiner

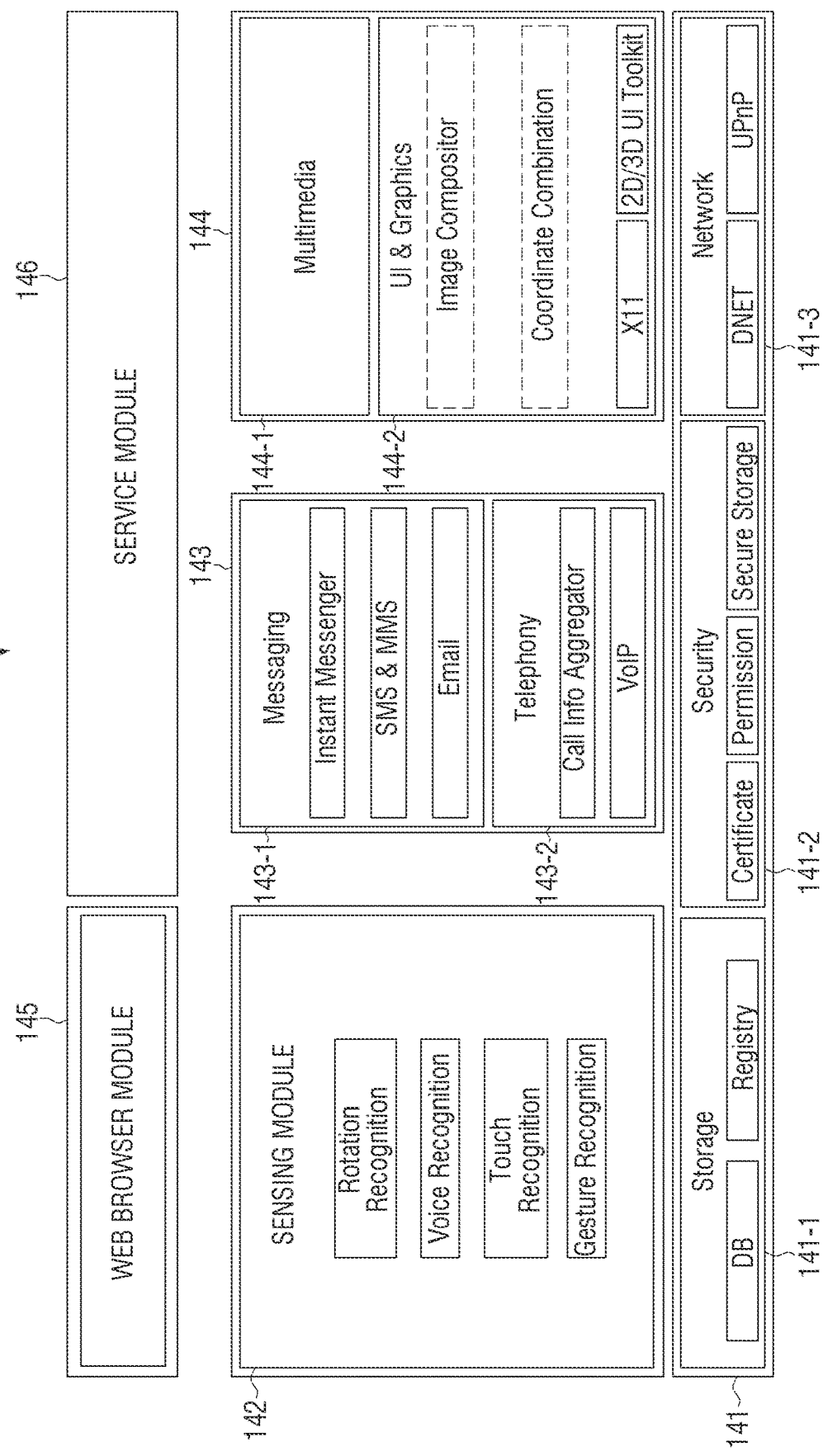

FIG. 6A

```
ENGLISH DICTIONARY Node

1) Name : ENGLISH DICTIONARY
2) Subject : English Dictionary
3) URL : None
4) Search URL : None
5) Parent Anchor
6) Children Anchor
7) Domain Level Info : 1
```

FIG. 6B

FIRST WEB ENGLISH DICTIONARY

1) Name : FIRST WEB ENGLISH DICTIONARY
2) Subject : English Dictionary
3) URL : http://endic.naver.com
4) Search URL :
   http://endic.naver.com/search.nhn?ie=utf8&query={query}
5) Parent Anchor
6) Children Anchor
7) Domain Level Info : 2

FIG. 6C

SECOND WEB ENGLISH DICTIONARY

1) Name : SECOND WEB ENGLISH DICTIONARY
2) Subject : English Dictionary
3) URL : http://engdic.daum.net
4) Search URL :
   http://engdic.daum.net/dicen/search.do?chset=utf8&q={query}
5) Parent Anchor
6) Children Anchor
7) Domain Level Info : 2

DISPLAY APPARATUS AND CONTROLLING METHOD THEREOF

CROSS-REFERENCE TO RELATED APPLICATION(S)

This application claims the benefit under 35 U.S.C. § 119(a) of a Korean patent application filed on Sep. 16, 2013 in the Korean Intellectual Property Office and assigned Serial number 10-2013-0110928, the entire disclosure of which is hereby incorporated by reference.

TECHNICAL FIELD

The present disclosure relates to a display apparatus and a controlling method thereof. More particularly, the present disclosure relates to a display apparatus which provides a search function and a controlling method thereof.

BACKGROUND

With the advance of electronic technology, various types of display apparatuses have been developed. In particular, display apparatuses such as a television, a Personal Computer (PC), a laptop computer, a tablet PC, a mobile phone, a digital audio player, etc. have been widely used in general household.

Recently, in order to satisfy a user's needs for more updated and diverse functions, even mobile devices such as the tablet PC and the mobile phone are providing a search function in a PC environment.

However, as a search function provided in a PC environment is applied to a mobile environment, usability of users is not considered.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display apparatus which provides a search function appropriate for a mobile environment and a controlling method thereof.

In accordance with an aspect of the present disclosure, a display apparatus is provided. The apparatus includes a display configured to display at least one of a first Graphic User Interface (GUI) representing a domain which provides an execution screen according to a depth, a user interface configured to receive a user command, and a controller configured to, when one of the at least one of the first GUI is selected according to the user command, display at least one of a second GUI representing a sub domain which is available in a domain represented by the selected first GUI, and when one of the at least one of the second GUI is selected, provide an execution screen corresponding to the sub domain based on sub domain information which is mapped with the selected second GUI.

The apparatus may further include a storage configured to store information regarding a sub domain according to a depth provided by the domain in a form of tree structure, and the tree structure may include an anchor representing inclusion relations between a parent node corresponding to the domain, a plurality of child nodes representing each sub domain which is available in the domain, the parent node, and the plurality of child nodes.

The tree structure may be downloaded, or generated and edited by a user manipulation.

The domain which provides the execution screen according to the depth may include at least one of an application domain, a search domain, a web domain, and a user history domain.

The controller may control to display an input window on one area of the display and to display the at least one of the first GUI on another area of the display, and when one of the at least one of the first GUI is selected and input to the input window, may control to display the at least one of the second GUI corresponding to the selected first GUI.

The controller, when the first GUI represents an upper search domain and the second GUI represents a lower search domain of the upper search domain, may control to display a screen of a result of a search which is performed in the lower search domain based on text information input to the input window after address information linked to the second GUI and the second GUI are selected.

The controller, when the first GUI represents an application domain and the second GUI represents a sub menu domain of the application domain, may provide an execution screen corresponding to a sub menu domain represented by the selected second GUI based on parameter information which is mapped with the selected second GUI.

The controller may classify domains representing at least one of the at least one of the first GUI and the at least one of the second GUI according to domain attributes, and groups and provide GUIs representing domains having the same attributes.

The controller may provide a new domain by combining the first GUI and the second GUI which are previously selected by a user sequentially based on a user's usage history.

In accordance with another aspect of the present disclosure, a method of controlling a display apparatus is provided. The method includes displaying at least one of a first GUI representing a domain which provides an execution screen according to a depth, when one of the at least one of the first GUI is selected according to the user command, displaying at least one of a second GUI representing a sub domain which is available in a domain represented by the selected first GUI, and when one of the at least one of the second GUI is selected, providing an execution screen corresponding to the sub domain based on sub domain information which is mapped with the selected second GUI.

The method may further include storing information regarding a sub domain according to a depth provided by the domain in a form of tree structure, and the tree structure may include an anchor representing inclusion relations between a parent node corresponding to the domain, a plurality of child nodes representing each sub domain which is available in the domain, the parent node, and the plurality of child nodes.

The tree structure may be downloaded, or generated and edited by a user manipulation.

The domain which provides the execution screen according to the depth may include at least one of an application domain, a search domain, a web domain, and a user history domain.

The displaying of the first GUI may include displaying an input window on one area of the display and displaying the at least one of the first GUI on another area of the display, and the displaying of the second GUI may include, when one of the at least one of the first GUI is selected and input to the input window, displaying the at least one of the second GUI corresponding to the selected first GUI.

The providing of the execution screen may include, when the first GUI represents an upper search domain and the second GUI represents a lower search domain of the upper search domain, displaying a screen of a result of a search which is performed in the lower search domain based on text information input to the input window after address information linked to the second GUI and the second GUI are selected.

The providing of the execution screen may include, when the first GUI represents an application domain and the second GUI represents a sub menu domain of the application domain, providing an execution screen corresponding to a sub menu domain represented by the selected second GUI based on parameter information which is mapped with the selected second GUI.

The providing of the first GUI and the second GUI may include, classifying domains representing at least one of the at least one of the first GUI and the at least one of the second GUI according to domain attributes, and grouping and providing GUIs representing domains having the same attributes.

The method may further include providing a new domain by combining the first GUI and the second GUI which are previously selected by a user sequentially based on a user's usage history.

In accordance with yet another aspect of the present disclosure, a non-transitory computer-readable storage medium is provided. The non-transitory computer-readable storage medium stores a program for controlling a display apparatus that, when executed, causes at least one processor to perform the above method.

As described above, according to an embodiment, a search screen which is appropriate for a mobile environment may be provided and thus, user convenience may be enhanced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a view provided to explain configuration of software stored in a storage according to an embodiment of the present disclosure;

FIGS. 6A, 6B, and 6C are views provided to explain node information of a tree structure according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be observed the method operations and system components have been represented by conventional symbols in the figure, showing specific details which are relevant for an understanding of the present disclosure. Further, details may be readily apparent to person ordinarily skilled in the art may not have been disclosed. In the present disclosure, relational terms such as first and second, and the like, may be used to distinguish one entity from another entity, without necessarily implying any actual relationship or order between such entities.

Figure 1A:
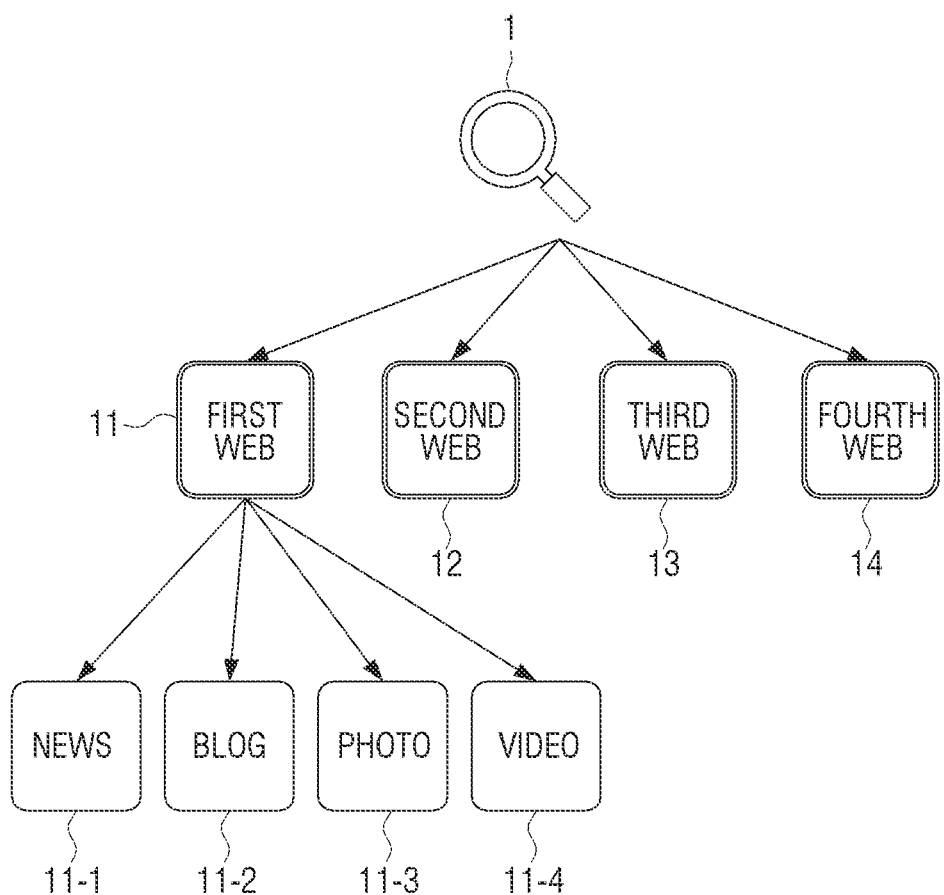
FIGS. 1A and 1B are views provided to explain a tree structure to help understanding according to an embodiment of the present disclosure.
Figure 1B:
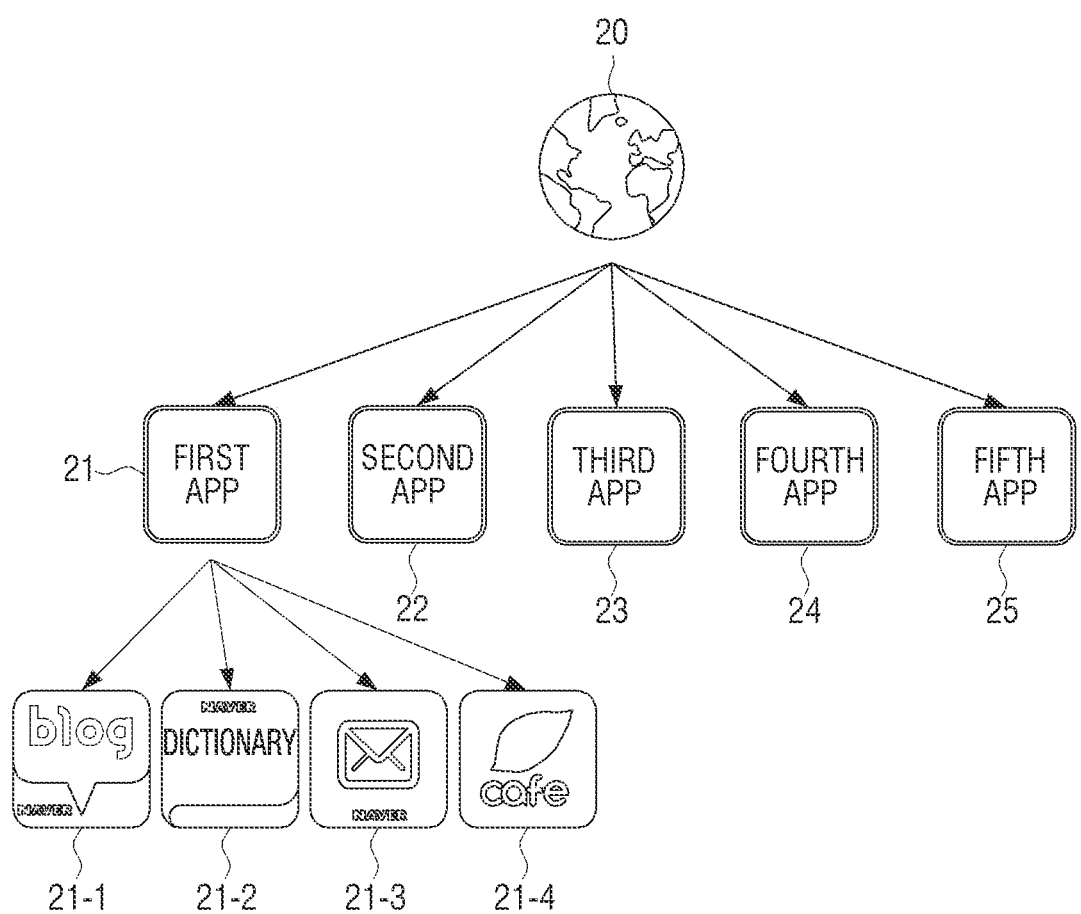

FIGS. 1A and 1B are views provided to explain a tree structure to help understanding according to an embodiment of the present disclosure.

The tree structure according to an embodiment illustrates a depth structure of a domain which provides an execution screen according to a depth, and each node in the tree structure may display a top level domain including a context of a sub domain (or a sub page) of the domain represented by the corresponding node. For example, a first web server 11 in FIG. 1A may represent a top level domain including all contexts of sub domains which can be provided by the corresponding web server, and a first web category 11-1 may represent a top level domain including all contents of sub domains which can be provided by the corresponding web category. Accordingly, shifting between nodes may represent shifting between domains rather than shifting between pages. Herein, each node may include fields such as Name, Subject, URL, Search URL (option), Parent Anchor, Children Anchor, Domain Level, Icon, etc.

In addition, the anchor represents relations between nodes and has directivity which refers to inclusion relations between up down nodes. For example, when upper domains are searched, lower domains are subject to the search, but the reverse does not hold true.

FIG. 1A is a view illustrating a tree structure of a search domain according to an embodiment of the present disclosure.

According to FIG. 1A, a search domain 1, for instance, may include a first to a second web servers 11 to 14, and each of the web servers 11 to 14 may include a plurality of search categories which can be provided by the corresponding web servers. For example, the first web server 11 may include search categories of news 11-1, blog 11-2, photo 11-3, and video 11-4. That is, the first web server 11 may become an upper domain, and the news 11-1, the blog 11-2, the photo 11-3, and the video 11-4 may become a lower domain.

Hereinafter, the first to the fourth web servers 11 to 14 are referred to as a domain according to the first depth of the search domain 1, and the news 11-1, the blog 11-2, the photo 11-3, and the video 11-4 are referred to as a domain according to the second depth for convenience of explanation.

FIG. 1B is a view illustrating a tree structure of an application domain according to another embodiment of the present disclosure.

According to FIG. 1B, an application domain 20, for example, may include first to fifth applications 21 to 25, and each of the applications 21 to 25 may include a plurality of sub categories which can be provided by the corresponding applications. Herein, the applications may include native applications which are intrinsic and built-in applications, and web applications which are based on the web.

For example, the first application 21 may include sub categories of blog 21-1, dictionary 21-2, mail 21-3, and café 21-4. That is, the first application 21 may become an upper domain, and the blog 21-1, the dictionary 21-2, the mail 21-3, and the café 21-4 may become a lower domain.

Hereinafter, the first to the fifth applications 21 to 25 are referred to as a domain according to the first depth of the application domain 20, and the blog 21-1, the dictionary 21-2, the mail 21-3, and the café 21-4 are referred to as a domain according to the second depth for convenience of explanation.

As described above, a tree structure (or a depth structure) according to an embodiment refers to a structure which represents the relations of super-sub depth of domains which provide an execution screen corresponding to a depth using a node and an anchor, such as web server, application, etc. Hereinafter, an embodiment will be explained in detail based on the above-described tree structure.

Figure 2A:
FIGS. 2A and 2B are a view illustrating configuration of a display apparatus according to various embodiments of the present disclosure.
Figure 2B:
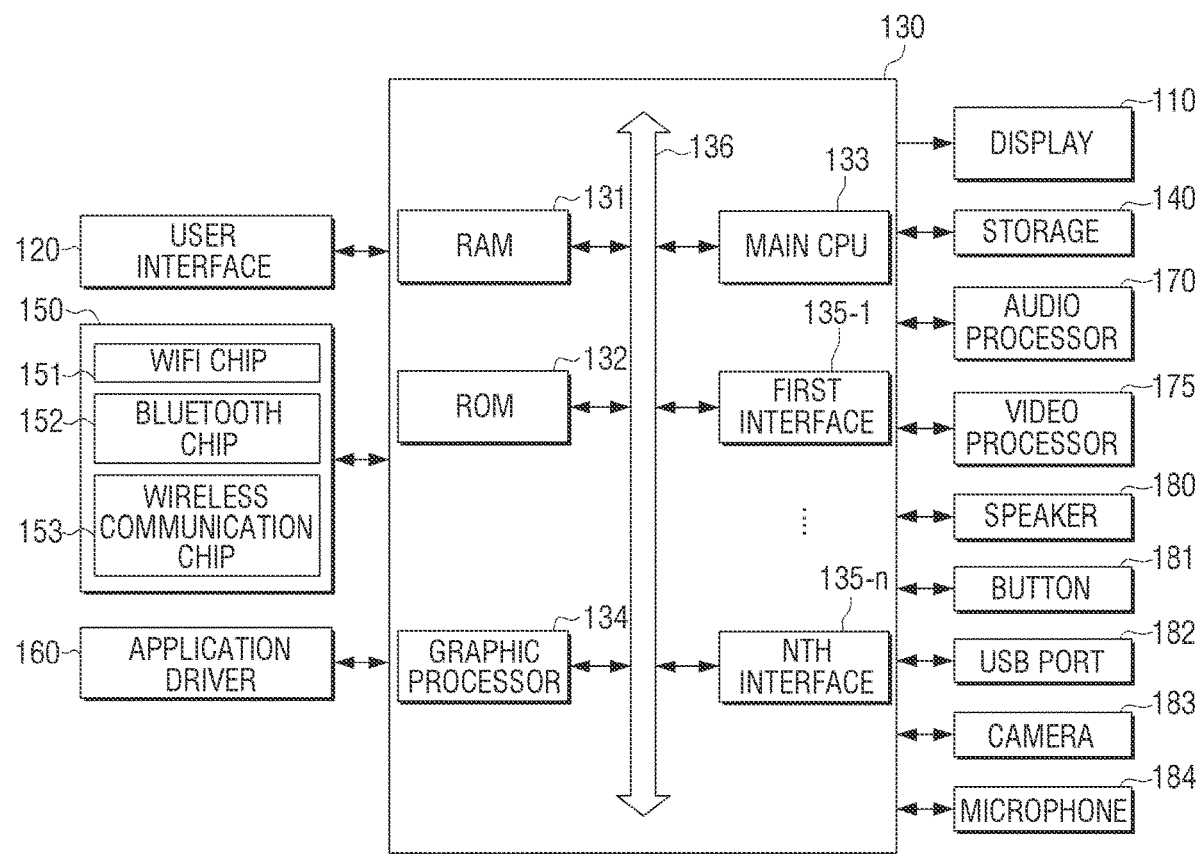

FIGS. 2A and 2B are views illustrating configuration of a display apparatus according to various embodiments of the present disclosure.

FIG. 2A illustrates configuration of a display apparatus according to an embodiment of the present disclosure.

Referring to FIG. 2A, a display apparatus 100 includes a display 110, a user interface 120, and a controller 130.

The display apparatus 100 may be any apparatus which has a display function. In particular, the display apparatus 100 may be realized as a mobile phone such as a smart phone, but is not limited thereto. The display apparatus 100 may be realized as various types of apparatuses which are portable and has a display function, such as tablet Personal Computer (PC), Portable Media Player (PMP), Personal Digital Assistant (PDA), navigation, etc. In addition, the display apparatus 100 may be configured to include a touch screen (or a touch panel) so that a program can be executed using a finger or a pen (for example, a stylus pen). In some cases, however, the display apparatus 100 may be any apparatus which can perform a function by receiving a remote control signal or inputting a button.

Meanwhile, the display apparatus 100 may be configured to provide various web services, application services, etc. in communication with a server (not shown) through a network. In particular, a service which provides a Graphic User Interface (GUI) screen according to an embodiment may be provided in the form of application which is software used directly by a user on Operation System (O/S), and the application may be provided in the form of an icon interface on the screen of the display apparatus 100. Herein, the server (not shown) may be realized as a web server for providing a web service, an application providing server for providing an application service, etc.

That is, a user may be provided with a GUI screen according to an embodiment by driving a specific application, and the GUI screen according to an embodiment may be generated by GUI information pre-stored in the display apparatus 100. In addition, the GUI screen according to an embodiment may also be generated by GUI information received from a server which provides the corresponding application service. Further, the GUI screen may be produced or added directly by a user.

The display 110 displays a screen. Herein, the screen may include various contents such as image, video, text, music, etc., an application execution screen including various contents, a GUI screen, etc.

In particular, the display 110 may display a GUI screen based on a tree structure according to an embodiment as illustrated in FIGS. 1A and 1B. For example, the display 110 may display a first GUI for representing a web server which is an upper domain and a second GUI for representing various sub categories provided by the corresponding web server which is a lower domain sequentially or simultaneously. In this case, the GUI may be provided in the form of icon, but is not limited thereto. In addition, the second GUI may be set as a default, or may be provided to a level representing a depth selected by a user.

Other types of GUI screens will be described later with reference to the corresponding drawings.

Meanwhile, the display 110 may be realized as Liquid Crystal Display Panel (LCD), Organic Light Emitting Diodes (OLED), etc., but is not limited thereto. In particular, the display 110 may be realized in a touch screen form which has an inter-layered structure with a touch pad. In this case, the user interface 120 may be used not only as an output device but also as the above-described user interface 120. Herein, the touch screen may be configured to detect not only the location and size of a touch input but also as the pressure of a touch input.

The user interface 120 receives various user commands. In particular, the user interface 120 may receive various user manipulations with respect to the GUI screen. For example, the user interface 120 may receive various user commands such as a command to select at least one of the first GUI and the second GUI, a command to input a search word on a search domain, etc.

The user interface 120 may be realized in the form of touch screen as described above, but in some cases, may be realized as a remote control signal receiver, a button input unit, a motion or a voice input unit, etc.

The controller 130 controls overall operations of the display apparatus 100. In particular, the controller 130 may display at least one of the first GUI which represents a domain for providing an execution screen according to a depth according to a user command. Herein, the domain which provides an execution screen according to a depth refers to web server, application, etc. which provides an execution screen according to a depth structure as described in FIGS. 1A and 1B. Herein, the execution screen according to a depth may be a screen which represents super-sub domains, but in some cases, it may represent super-sub menus, super-sub contents, etc.

For example, an application such as a calendar may provide an execution screen corresponding to a monthly schedule in the first depth where the application is executed, and may provide an execution screen corresponding to a daily schedule in the second depth where a specific date is selected in the monthly schedule. That is, the node of a tree structure according to an embodiment may have various forms according to the characteristics of a domain which is located on the upper end of the tree structure.

However, for convenience of explanation, it is assumed that each node of the tree structure represents super-sub domains in this embodiment.

When one of the first GUI is selected, the controller 130 may control to display at least one of the second GUI which represents sub domains that can be provided by the upper domain represented by the selected first GUI.

For example, if a GUI which represents a specific web server from among the first GUI is selected, the controller 130 may control to display the second GUI which represents sub domains that can be provided by the selected web server, such as news, blog, photo, video category, etc.

In addition, if at least one of the second GUI is selected, the controller 130 may control to execute a sub domain corresponding to the second GUI which is selected based on information mapped with the selected second GUI.

For example, if the second GUI which represents a news category is selected from among the second GUI which represents news, blog, photo, video category, etc., the controller 130 may control to display a screen where a news category, that is, a news domain is executed.

Accordingly, a user may directly enter into a domain corresponding to the second depth without displaying a domain according to the first depth by selecting one of the second GUI representing a sub domain, which is displayed automatically as the first GUI representing a specific upper domain is selected. That is, the embodiment allows a user to enter into a desired sub domain more swiftly in comparison with the related art which executes a domain corresponding to the second depth according to a user command while a domain corresponding to the first depth is executed, and the display apparatus 100 does not need to load an unnecessary screen.

Meanwhile, if a domain corresponding to the first GUI provides a search domain, the controller 130 may control to display a search screen where a search is conducted based on information linked to the second GUI which is selected from among the second GUI corresponding to the first GUI and text information input after the second GUI is selected. That is, the controller 130 controls too display a search result screen where a search is conducted based on text information input from a sub search domain corresponding to the second GUI. Specifically, the controller 130 may control to transmit link information corresponding to the second GUI, that is, Uniform Resource Locator (URL) information corresponding to a sub domain regarding the second GUI and input text information to the corresponding server, and receive and display the search result which is conducted in the corresponding server.

For example, if the first GUI representing a specific web search server is selected and a photo category is selected from among the second GUI representing a plurality of search categories which can be provided by the corresponding web server, such as news, blog, photo, video category, etc., a search result screen where a search is conducted in the photo category based on text information which is input after the selection of the category, for example, "New York", may be displayed. That is, when the first GUI representing a specific web search server and the second GUI representing a photo category is selected sequentially and the text, "New York" is input, a search result screen where "New York" is searched in the photo category of the corresponding web search server may be displayed. However, the order of inputting or displaying the first GUI, the second GUI, and the text may not be limited thereto, and may be changed in various ways.

In this case, the controller 130 may control to display an input window on one area of the screen, display at least one of the first GUI on another area of the screen, and when one of the at least one of the first GUI is selected, display at least one of the second GUI corresponding to the selected first GUI.

Specifically, when a user command to touch one of the first GUI and drag the GUI to an input window is input and thus, the first GUI is input to the input window, the controller 130 may control to display at least one of the second GUI corresponding to the first GUI in an area where the first GUI used to be displayed. In this case, when a user command to touch the second GUI and drag the GUI to the input window is input and then, text information is input, the controller 130 may control to display a search result screen where a search corresponding to the input text information is conducted in a category corresponding to the second GUI. In this case, the selected first GUI, the selected second GUI, and the input text may be displayed in the input window sequentially.

Meanwhile, the controller 130 may classify domains corresponding to at least one of the first GUI and at least one of the second GUI according to domain attributes, and group and provide domains having the same attributes.

For example, the controller 130 may group the first GUI representing the first to the nth web servers as the first group, group the first GUI representing the first to the nth applications as the second group, and provide them to a different area. In addition, the controller 130 may group the second GUI representing a search engine from among the second GUI representing a sub category provided by the first web server which is provided as the GUI representing the first web server is selected from among the first GUI as the third group, group the second GUI representing an application as the fourth group, and provide them to a different area.

Further, the controller 130 may combine the first GUI and the second GUI which are previously selected by a user sequentially in the form of one GUI, and group and provide them to another area.

For example, when the first web server is selected previously, and a dictionary search category which is a sub category provided in the first web server is selected, the controller 130 may combine the first GUI representing the corresponding first web server with the second GUI representing the dictionary search category in one folder and provide the same.

In this case, the controller 130 may manage a tree structure corresponding to a folder GUI which is generated based on a user history as a temporary tree.

However, when a folder GUI provided in a user history area is selected and moved to a domain area designated as a default, for example, a web server domain area, the controller 130 may register a node at the lowest rank of the corresponding folder GUI as a regular tree. For example, in the above-described embodiment, the dictionary search category of the first web server may be managed as an independent node without a parent node and a child node. However, after the corresponding node is registered as a regular tree, the node may be moved to another tree or a child node may added based on a user's editing, manipulation history, etc., which will be described in detail further below with reference to drawings.

Meanwhile, the controller 130 may provide a screen based on pre-stored information on a tree structure, which is pre-stored or received from an external server.

For example, when the second GUI representing the dictionary search category is selected after the first GUI representing the first web server is selected, the controller 130 may provide an execution screen according to selection of the second GUI based on information linked to the second GUI. For example, the controller 130 may provide a dictionary domain of the first web server according to selection of the second GUI based on, for example, http://endic.naver-.com, which is linked to the second GUI.

In another example, when the second GUI representing the dictionary search category is selected after the first GUI representing the first web server is selected and then, text information is input, the controller 130 may provide a screen where a search is conducted based on, for example, http://endic.naver.com/search.nhn?ie=utf8&query={query} which is a search URL.

Meanwhile, a search query from among various web queries may be classified according to at least one of DataBase (DB)-based method, Query analysis-based method and Hybrid method.

The DB-based method generates Query URL DB related to a search and determines Query URL according to whether there is a match with the URL in the DB at every search. Herein, the Query URL DB may be input manually or downloaded and shared from a server, etc. In this case, validity test or update may be performed with respect to the Query URL in the DB regularly, or DB may be updated by a user when it is necessary.

The Query analysis-based method determines Query URL by performing a sentence parsing process with respect to Query URL and determining whether there is Token combination corresponding to Search Query Pattern.

For example, the Search Query Pattern may include query={xxxx}, q={xxxx}, search={xxxx}, term={xxxx}, key={xxxx}, etc.

In the case of "query={xxxx}", there would be an example of "http://search.naver.com/search.naver?ie=utf8&where=nexearch&query=samsung", in the case of "q={xxxx}", there would be an example of "http://local.daum.net/map/index.jsp?map_type=TYPE_MAP&map_hybrid=false&q=samsung", and in the case of "search={xxxx}", there would be an example of "itunes://ax.search.itunes.apple.com/WebObjects/MZSearch.woa/wa/search?term=samsung".

Meanwhile, the Hybrid method uses DB and Query analysis in parallel, and may use the DB-based method as a basic method, add DB with respect to new Query based on Query analysis result, and perform an update.

FIG. 2B is a block diagram illustrating configuration of a display apparatus 100' according to another embodiment of the present invention.

Referring to FIG. 2B, the display apparatus 100' includes the display 110, the user interface 120, the controller 130, a storage 140, a communicator 150, an application driver 160, an audio processor 170, a video processor 175, a speaker 180, a button 181, a Universal Serial Bus (USB) port 182, a camera 183, and a microphone 184. The elements of FIG. 2 which are overlapped with the elements of FIGS. 1A and 1B will not be described in detail.

The storage 140 stores various data such as an O/S software module, various applications, and various contents which are input or set during execution of applications.

In particular, the storage 140 may store a tree structure according to an embodiment, that is, various types of tree structures as illustrated in FIGS. 1A and 1B.

Specifically, the storage 140 may store fields such as Name, Subject, URL, Search URL (option), Parent Anchor, Children Anchor, Domain Level, Icon, etc. with respect to each node which forms a tree.

Herein, the tree structure may be produced directly by a user of the display apparatus 100', provided by a third party, or may be generated automatically.

When the tree structure is produced directly by a user, the user may produce the tree by determining everything from the type of domain, or may edit the tree by adding a desired node or deleting a node based on a basic tree.

When the tree structure is generated automatically, the tree structure may be generated automatically based on a user's usage pattern, a user's usage history, etc.

For example, if a user searches a word based on an English dictionary of the first web server for the first time, the display apparatus 100' may recognize that there is a word search in the English dictionary, extract the corresponding URL, and add the URL to an appropriate location of the previous first web server tree. If the previous first web server tree does not exist, the tree may be generated as the corresponding English dictionary domain is set as a new top level node or the first web server is set as a top level node.

Specifically, the morpheme of a Request URL which is transmitted from the display apparatus 100' to an external server is analyzed, and whether "={ }" which is a part where a search query is inserted is included in the Request URL is determined. If it is determined that "={ }" is included in the Request URL, the corresponding URL is analyzed, a top level domain URL and a search URL are extracted, and a node is generated. If there is a parent node corresponding to the top level domain, the corresponding node is added as a child node of the parent node, but if there is no parent node, the corresponding node may be added to an etc. tree, or a new tree may be generated. In this case, the new tree may be generated by a user's selection or may be generated automatically according to default standard.

Figure 3:
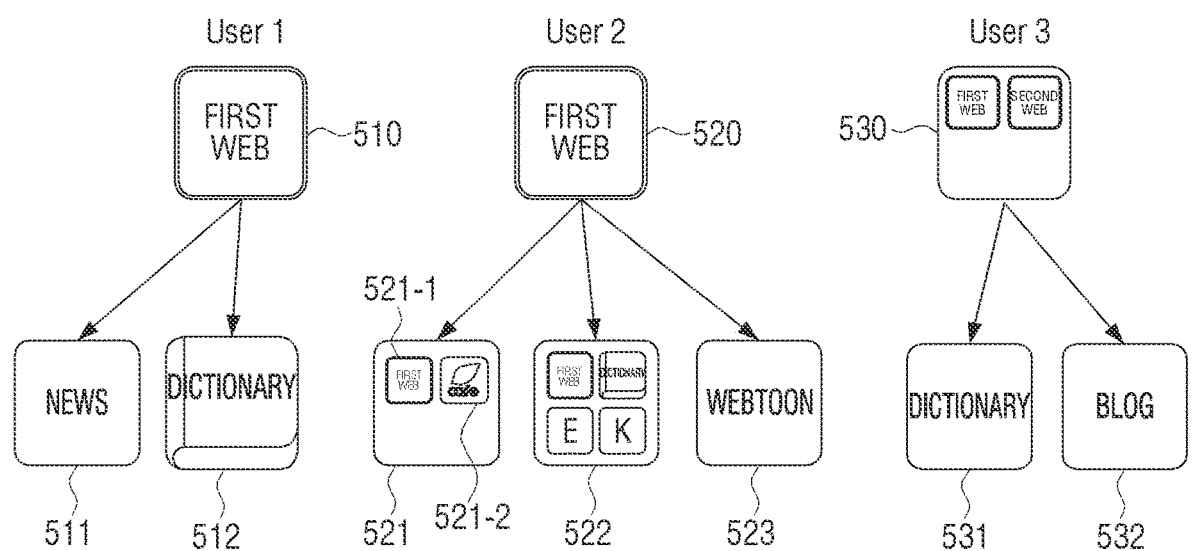
FIG. 3 is a view provided to explain a tree structure according to various embodiments of the present disclosure.

FIG. 3 is a view provided to explain a tree structure according to various embodiments of the present invention.

As illustrated in FIG. 3, a tree structure may vary according to each user.

For example, user 1 may have a structure including the second GUI of a news 511 and a dictionary 512 as sub nodes of the first GUI 510, user 2 may have a tree structure including the second GUI 521 to 522 in the form of folders and the second GUI of a webtoon 523 as a sub depth of the first GUI 520, and user 3 may have a tree structure including the second GUI of a dictionary 531 and a blog 532 as a sub depth of the first GUI 530. Herein, the GUI in the form of folder means a folder including a plurality of GUIs, and for example, a GUI representing first web server and the second web server may be included in one folder. In this case, when the folder is selected, the first web server and the second web server which have the same depth may be executed simultaneously. In another example, when a GUI in a folder has a different depth, a domain corresponding to the GUI which has the lowest depth in the folder may be executed. For example, if the second GUI 521 in the form of a folder which includes GUI 521-1 corresponding to the first web server and GUI 521-2 corresponding to a café category is selected, the café category which has the lower depth may be executed.

The above tree structure may be stored in the storage 140 for each user terminal, or may be stored in an external server (not shown) for each user account.

In addition, the storage 140 may store various software modules as illustrated in FIG. 4.

According to FIG. 4, the storage 140 may store software including a base module 141, a sensing module 142, a communication module 143, a presentation module 144, a web browser module 145, and a service module 146.

The base module 141 is a basic module which processes a signal transmitted from each hardware included in the display apparatus 100' and transmits the processed signal to an upper layer module. The base module 141 includes a storage module 141-1, a security module 141-2 and a network module 141-3. The storage module 141-1 is a program module which manages DataBase (DB) or registry.

The main CPU 143 may access a database of the storage 140 using the storage module 141-1 and read various data. The security module 141-2 is a program module which supports certification, request permission, secure storage, etc., and the network module 141-3 is a module which supports network connection and may include a DNET module, a Universal Plug and Play (UPnP) module, etc.

The sensing module 142 collects information from various sensors, and analyzes and manages the collected information, and may include a face recognition module, a voice recognition module, a motion recognition module, a Near Filed Communication (NFC) recognition module, and so on.

The communication module 143 is a module to perform communication with the outside. The communication module 143 may include a messaging module 143-1 such as messenger program, Short Message Service (SMS) & Multimedia Message Service (MMS) program, e-mail program, etc., a telephone module 143-2 including a call info aggregator program module, a Voice over Internet Protocol (VoIP) module, etc.

The presentation module 144 is a module to compose a display screen, and may include a multimedia module 144-1 to reproduce and output multimedia contents and a UI rendering module 144-2 to perform UI and graphic processing. The multimedia module 144-1 may include a player module, a camcorder module, a sound processing module, etc. Accordingly, the multimedia module 144-1 performs the operation of reproducing various multimedia contents and generating and reproducing screens and sounds accordingly. The UI rendering module 1440-2 may include an image compositor module which combines images, a coordinates combination module which combines and generates a coordinates on the screen where an image is to be displayed, an X11 module which receives various events from hardware, a 2 Dimensional (2D)/3 Dimensional (3D) UI toolkit which provides a tool to compose a UI in 2D or 3D form.

The web browser module 145 is a module to access a web server by performing web browsing. The web browser module 145 may include various modules such as a web view module to compose a web page, a download agent module to perform downloading, a bookmark module, a webkit module, etc.

The service module 146 is a module including various applications to provide various services. Specifically, the service module 146 may include various program modules such as navigation program, content play program, game program, electronic book program, calendar program, alarm management program, other widgets, etc. In particular, the service module 146 may include a program module which provides a phonebook service according to an embodiment.

FIG. 4 illustrates various program modules according to an embodiment of the present invention, but some of the program modules may be omitted, changed, or added depending on the type and characteristics of the display apparatus 100'. For example, a location-based module which supports a location-based service in association with hardware, such as a Global Positioning System (GPS) chip, may be further included.

The communicator 150 performs communication with a server (not shown).

In particular, the communicator 150 may upload or download a depth structure stored in the storage 140 to and from a server (not shown) under the control of the controller 130 which will be described further below.

In addition, if a specific GUI is selected, the communicator 150 may communicate with a server corresponding to the selected GUI and receive information regarding the corresponding execution screen. For example, when a GUI representing a dictionary category of the first web server is selected, the communicator 150 may receive information regarding an execution screen corresponding to the dictionary category. Specifically, the communicator 150 may transmit URL information corresponding to the selected GUI, receive information regarding an execution screen corresponding to the corresponding URL information from a server, and display the execution screen accordingly under the control of the controller 130.

Meanwhile, the communicator 150 may perform communication with an external apparatus according to various types of communication method.

A WiFi chip 151 and a Bluetooth chip 152 perform communication according to a WiFi method and a Bluetooth method, respectively. The wireless communication chip 153 refers to a chip which performs communication according to various communication standards such as Institute of Electrical and Electronics Engineers (IEEE), Zigbee, 3rd Generation (3G), 3rd Generation Partnership Project (3GPP), Long Term Evolution (LTE). In addition, the communicator 150 may further include an NFC chip which operates according to an NFC method by using 13.56 MHz from among various Radio Frequency IDentification (RF-ID) frequency bands such as 135 kHz, 13.56 MHz, 433 MHz, 860~960 MHz, 2.45 GHz, and so on.

The application driver 160 drives and executes an application which can be provided by the display apparatus 100'. Herein, the application may refer to an application program which is executable by itself and may include various multimedia contents. Herein, the term, 'multimedia contents' includes text, audio, still image, animation, video, interactive contents, Electronic Program Guide (EPG) contents from a content provider, electronic message received from users, information regarding current events, etc. but is not limited thereto.

In particular, if a GUI representing an application is selected, the application driver 160 may drive the corresponding application.

The audio processor 170 is an element which processes audio data. The audio processor 170 may perform various processing with respect to audio data such as decoding, amplification, noise filtering, and so on.

The video processor 175 is an element which processes video data. The video processor 175 may perform various processing with respect to video data such as decoding, scaling, noise filtering, frame rate conversion, resolution conversion, and so on.

The speaker 180 is an element which outputs not only various audio data processed by the audio processor 170 but also various alarm sounds and voice messages.

The button 181 may be configured in various ways such as mechanical button, touch pad, wheel, etc. which are formed on a certain area of the display apparatus 100', such as on the front, side, or real of the external surface of the main body. For example, a button to turn on/off the power of the display apparatus 100' may be provided.

The USB port 182 may perform communication with various external apparatuses through a USB cable or perform recharging.

The camera 183 is an element to photograph a still image or a moving image under the control of a user. The camera 183 may consist of a plurality of cameras such as a front camera and rear camera.

The microphone 184 is an element to receive a user voice or other sound and convert the same to audio data. The controller 130 may use a user voice input through the microphone 184 during a call, or may convert the user voice into audio data and store the same in the storage 140.

When the camera 183 and the microphone 184 are provided, the controller 130 may perform a control operation according to a user voice input through the microphone 184 or a user motion recognized by the camera 183. That is, the display apparatus 100' may operate in a motion control mode or a voice control mode. When the display apparatus 100' operates in the motion control mode, the controller 130 photographs a user by activating the camera 183, traces change in a user motion, and performs a corresponding control operation. When the display apparatus 100' operates in the voice control mode, the controller 130 analyzes a user voice input through the microphone, and performs a control operation according to the analyzed user voice.

In addition, various external input ports to connect to various external terminals such as headset, mouse, Local Area Network (LAN), etc. may be further included.

The controller 130 controls overall operations of the display apparatus 100' using various programs stored in the storage 140.

For example, the controller 130 may configure and display an execution screen by executing an application stored in the storage 140, or may reproduce various contents stored in the storage 140. In addition, the controller 130 may perform communication with external apparatuses through the communicator 130.

Specifically, the controller 130 comprises a Random Access Memory (RAM) 131, a Read Only Memory (ROM) 132, a main Central Processing Unit (CPU) 133, a graphic processor 134, first to nth interface 135-1~145-n, and a bus 146.

The RAM 141, the ROM 142, the main CPU 143, the graphic processor 144, and the first to nth interface 145-1~145-n may be connected to each other through the bus 136.

The first to nth interface 145-1~145-n are connected to the above-described components. One of the interfaces may be a network interface which is connected to an external apparatus via network.

The main CPU 143 accesses the storage 140 and performs booting using an O/S stored in the storage 140. In addition, the main CPU 143 performs various operations using various programs, contents, and data stored in the storage 140.

The ROM 142 stores a set of commands for system booting. If a turn-on command is input and thus, power is supplied, the main CPU 143 copies an O/S stored in the storage 140 in the RAM 141 according to a command stored in the ROM 142 and executes the O/S to boot the system. Once the system booting is completed, the main CPU 143 copies various application programs stored in the storage 140 in the RAM 141 and performs various operations by executing the application programs copied in the RAM 141.

The graphic processor 144 generates a screen including various objects such as icon, image, text, etc. using an operator (not shown) and a renderer (not shown). The operator (not shown) calculates property values such as coordinates, shape, size, color, etc. of a screen where each object is displayed according to a layout of the screen. The renderer (not shown) generates a screen of various layouts including an object based on the property values calculated by the operator. The screen generated by the renderer (not shown) is displayed within a display area of the display 110.

Meanwhile, the above-described operations of the controller 130 may be performed by a program stored in the storage 140. The storage 140 may store various data such as O/S software module to drive the display apparatus 100', various applications, various contents which are input or set during execution of applications, etc.

In particular, the storage 140 may store profile information of other users which is received from outside.

Other various software modules which are stored in the storage 140 will be described further below.

Meanwhile, albeit not illustrated in the drawings, the display apparatus 100' may further include a sensor (not shown) and a feedback provider (not shown).

The sensor (not shown) may sense various manipulations such as a touch, a rotation, a tilt, a pressure, an approach, etc. with respect to the display apparatus 100'.

In particular, the sensor (not shown) may include a touch sensor which senses a touch. The touch sensor may be realized as capacitive or resistive sensor. In addition, the sensor (not shown) may further include a geomagnetic sensor which senses the rotation state and motion direction of the display apparatus 100' and an acceleration sensor which senses the tilt degree of the display apparatus 100'.

The feedback provider (not shown) provides various feedbacks according to a function executed by the display apparatus 100'. In particular, the feedback provider (not shown) may provide a haptic feedback regarding a GUI displayed on the screen. For example, a haptic feedback may be provided when at least one of the first GUI and the second GUI is touched and dragged to an input window. In this case, the feedback provider (not shown) may provide various feedbacks by applying vibration conditions (for example, vibration frequency, vibration length, vibration intensity, vibration wave form, vibration location, etc.) differently under the control of the controller 130. In this case, the method of generating various haptic feedbacks by applying a vibration method differently is the prior art, so detailed description regarding the method will not be provided.

Meanwhile, FIG. 2B illustrates an example of detailed elements included in the display apparatus 100', and depending on various embodiments, some of the elements illustrated in FIG. 2B may be omitted or changed, or other elements may be added. For example, a GPS receiver (not shown) to receive a GPS signal from a GPS satellite, and calculate the current location of the display apparatus 100', a Digital Multimedia Broadcasting (DMB) receiver (not shown) to receive and process a DMB signal, etc. may be further included.

Figure 5A:
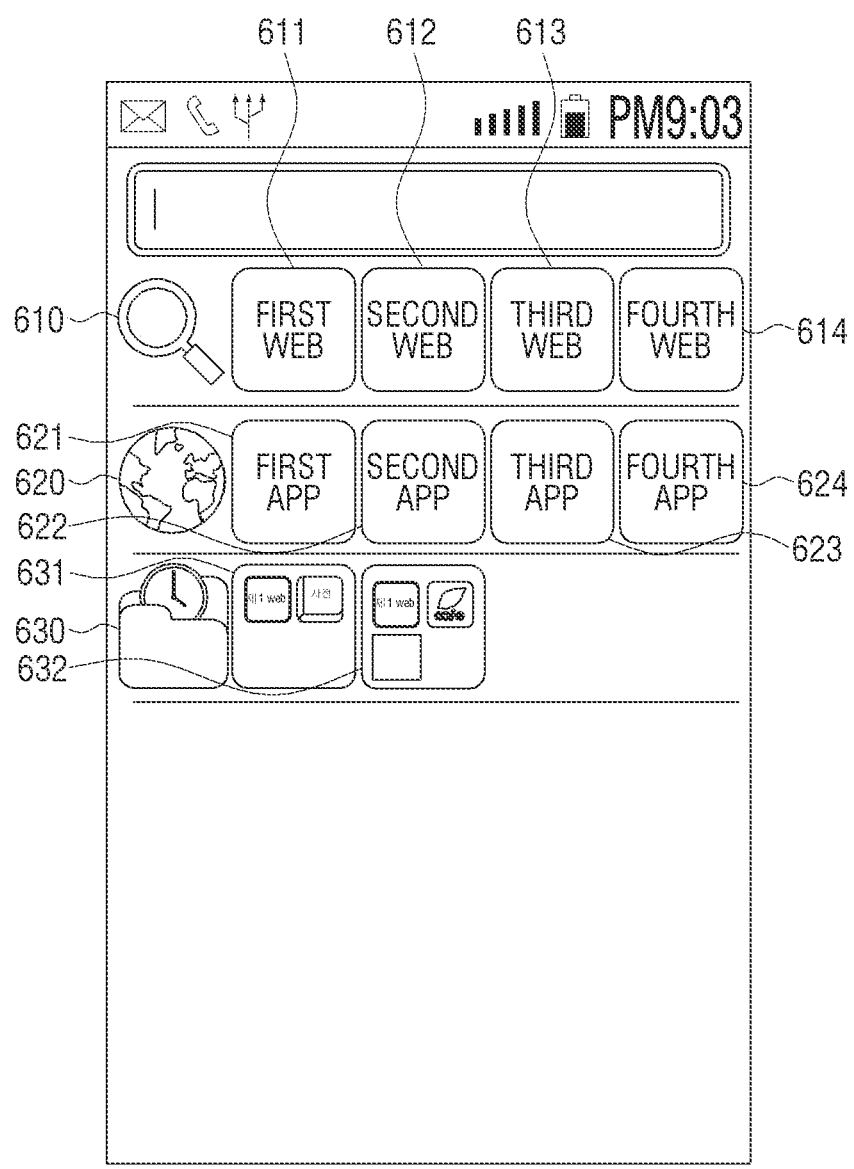
FIGS. 5A and 5B are views provided to explain a way of providing a Graphic User Interface (GUI) screen according to various embodiments of the present disclosure.
Figure 5B:
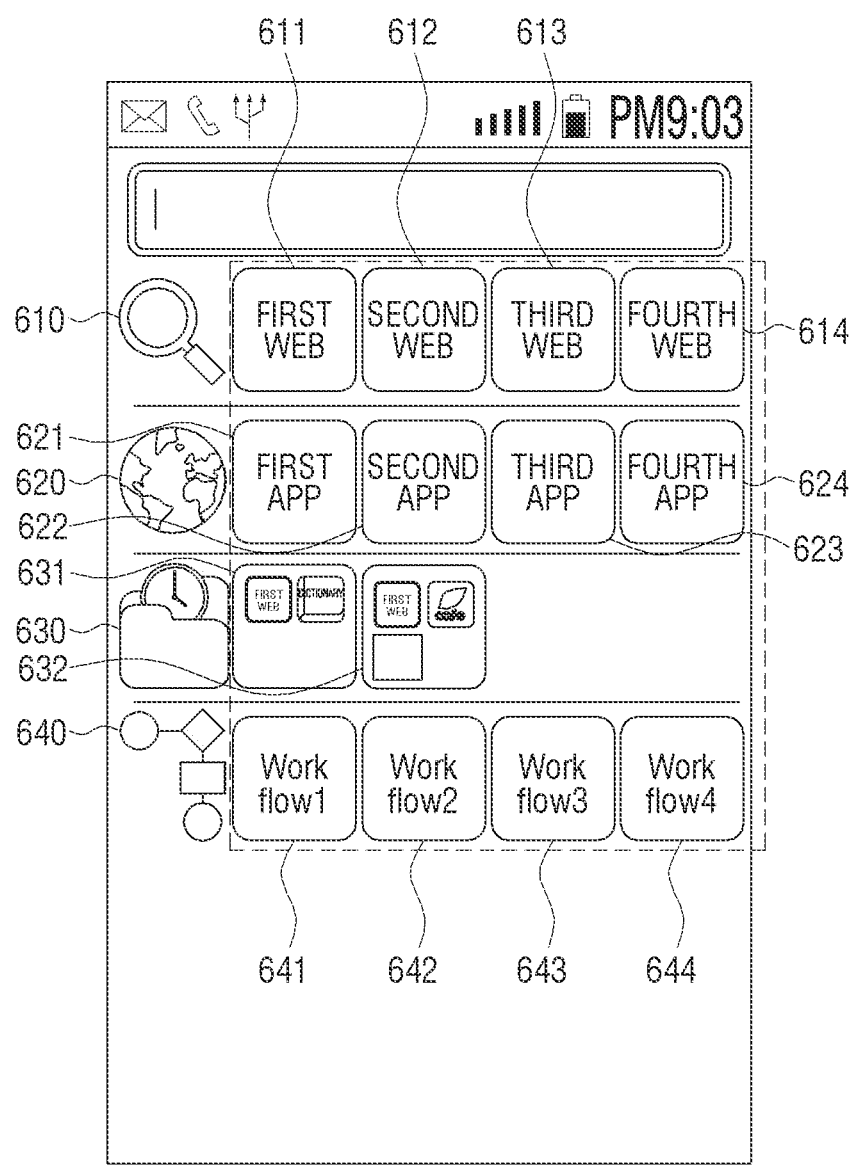

FIGS. 5A and 5B are views provided to explain a way of providing a GUI screen according to various embodiments of the present invention.

According to FIG. 5A, a GUI screen according to an embodiment may include GUIs 610, 620, and 630 representing a domain type and GUIs 611-614, 621-624, and 631-632 representing a sub domain which belongs to each domain.

Specifically, the GUI 610 representing a search domain, the GUI 620 representing an application domain and the GUI 630 representing a sub category domain may be classified for each area and displayed on the GUI screen.

The areas which are classified into GUIs 610, 620, and 630 representing a domain type, respectively, may arrange and display the first GUIs which belong to the corresponding domain type. For example, GUIs 611 to 614 representing a plurality of web servers may be arranged and displayed in the right side of the GUI 610 representing a search domain. Herein, the order of arranging the GUIs 611 to 614 may be set as a default, set by a user, or set automatically based on user preference. For example, a GUI representing a web server which has the highest user preference may be displayed for the very first time.

Meanwhile, GUIs 631, 632 which belong to a user history domain may be provided in the form of folder, and the corresponding folder may be generated automatically according to a user's selection history or may be edited by a user after being generated. For example, if there is a user's selection history of selecting the first web server and then, selecting a dictionary category, a GUI representing the first web server and a GUI representing a dictionary category may be provided in one folder. In this case, if the corresponding folder GUI 631 is selected, the dictionary category of the first web server which is the lowest domain may be executed.

According to FIG. 5B, GUI 640 representing a work flow domain may be further included in addition to the GUI screen illustrated in FIG. 5A. The work flow domain may include GUIs 641 to 644 representing "work flow" which is generated by a user's editing or generated based on a user's manipulation history, which will be explained in detail with reference to the drawings.

FIGS. 6A to 6C are views provided to explain node information of a tree structure according to an embodiment of the present invention.

FIGS. 6A to 6C are views provided to explain information on each node when nodes with the same subject, but with different web server domains, form a new tree. That is, a specific subject in the corresponding tree structure may be a top level node, and each web server may be sub nodes.

For example, it is assumed that an upper node is an English dictionary node, and a sub node is the first web server and second web server nodes.

FIG. 6A is a view illustrating information on node where the upper node is an English dictionary node, and when nodes with the same subject form a tree, the English dictionary node which is the top level node may have information such as name, subject, domain level, etc., but may not have information such as URL, search URL, etc.

If a domain without URL and search URL is selected and then, a query, that is, a search word is input, a search query may be requested sequentially using a search URL that every sub domain has, and the corresponding search result may be provided on the screen as being split, or may be provided sequentially.

FIGS. 6B and 6C are views illustrating information on a node of an English dictionary node of the first web server and the second web server which are sub nodes, and the English dictionary node of the first and the second web servers may include not only information such as name, subject, domain level, etc. but also information such as URL, search URL, etc. Herein, the search URL refers to URL for a real search, and if a search word is inserted to a {query} part, the corresponding search result may be provided on the screen as being split, or may be provided sequentially.

Figure 7A:
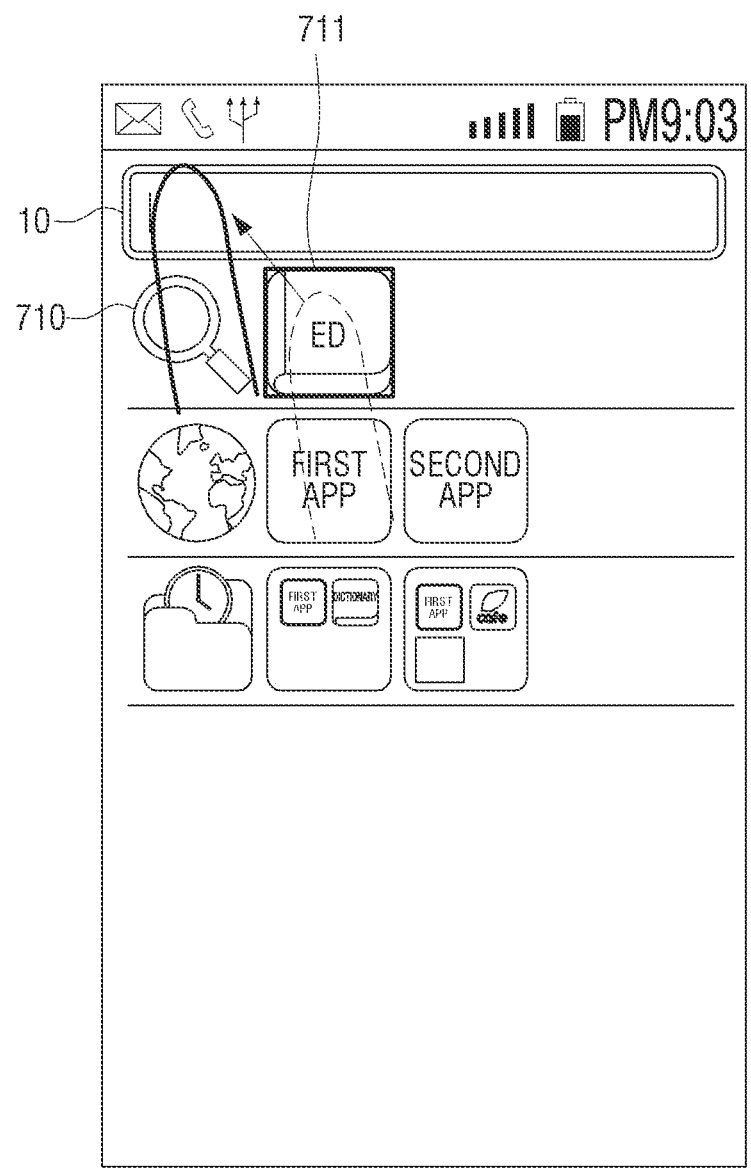
FIGS. 7A, 7B, and 7C are views provided to explain a method of providing a GUI screen according to node information illustrated in FIGS. 6A, 6B, and 6C according to an embodiment of the present disclosure.
Figure 7B:
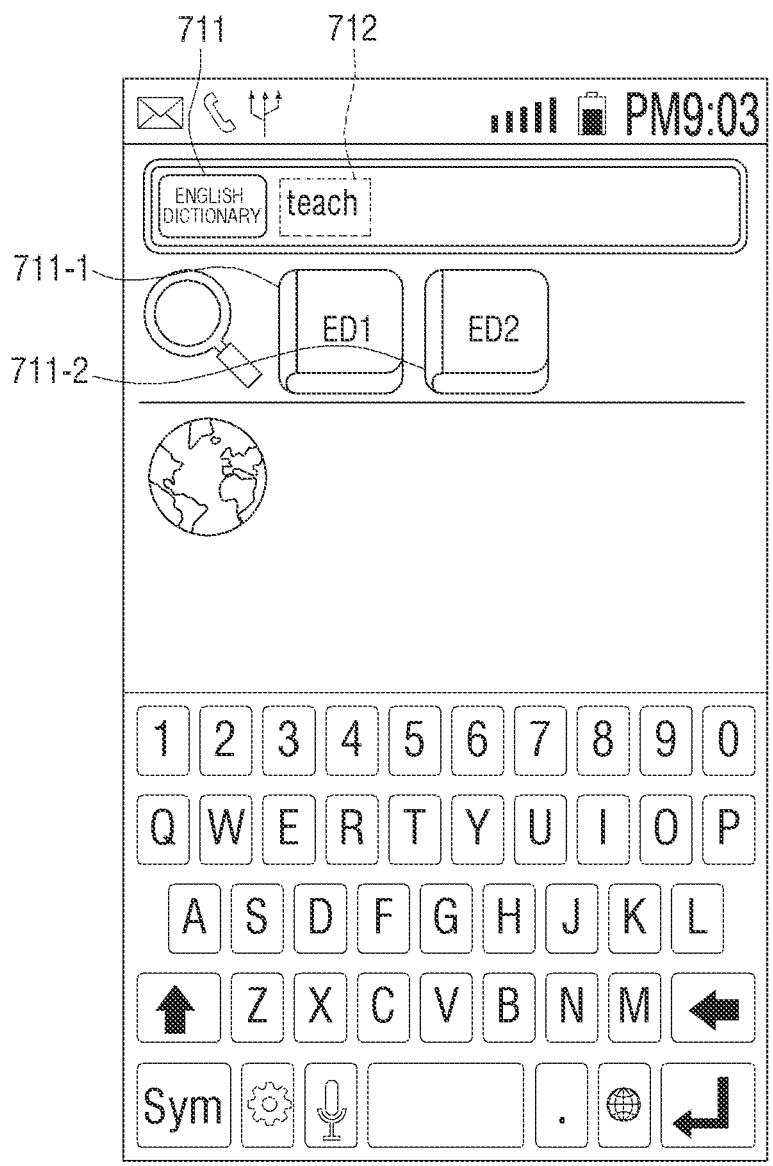
Figure 7C:
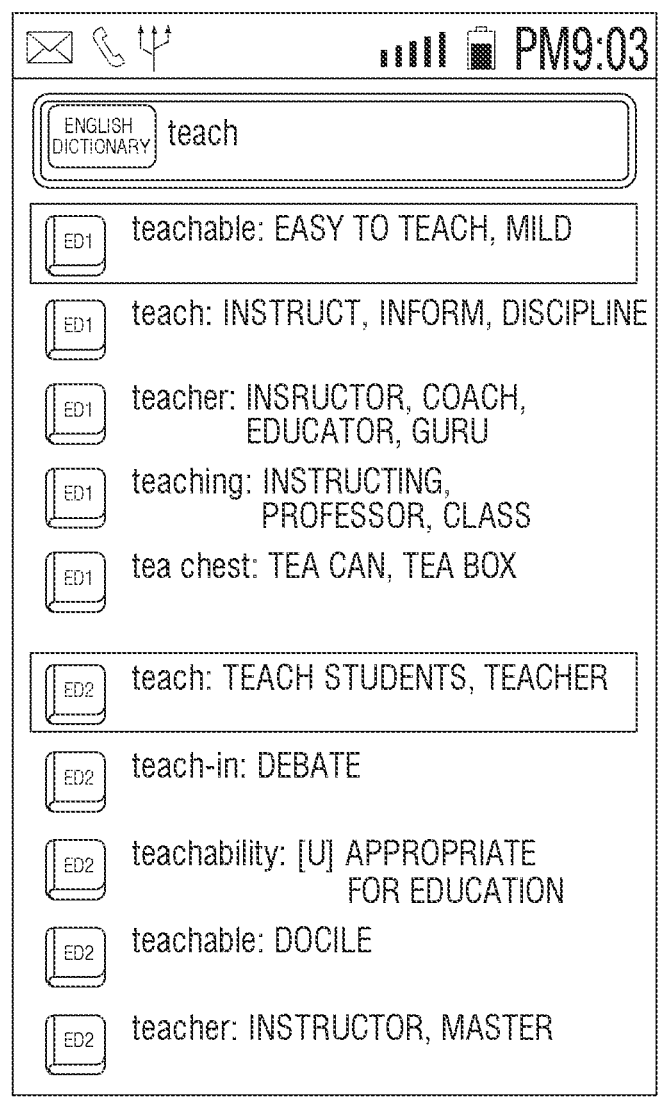

FIGS. 7A to 7C are views provided to explain a method of providing a GUI screen when each node of a tree structure has information illustrated in FIGS. 6A to 6C according to an embodiment of the present invention.

As illustrated in FIG. 7A, a GUI representing a web server may not be provided on an area 710 representing a search domain, and GUI 711 representing a specific subject may be provided. That is, GUI 711 representing an English dictionary may be provided as illustrated in the drawing.

When English Dictionary (ED) GUI 711 representing an English dictionary is selected, GUIs 711-1, 711-2 representing a sub node of the English dictionary may be displayed as illustrated in FIG. 7B. For example, ED1 GUI (English dictionary 1) representing English dictionary 1 of the first web server and ED 2 GUI 711-2 representing English dictionary 2 of the second web server may be displayed.

Meanwhile, a GUI may be selected by a user manipulation of touching the corresponding GUI 711 and dragging the GUI to the input window 10 as illustrated in the drawing, but is not limited thereto. In another embodiment, a GUI may be selected by a user manipulation of double-touching (or double-tapping) the corresponding GUI 711.

When a user selects the ED GUI 711 and inputs a search word 712, a search result in an English dictionary domain may be provided as illustrated in FIG. 7C. In this case, a search is conducted in a domain including the English dictionary 1 and the English dictionary 2 as illustrated in the drawing, and the search result may be provided distinctively.

In the above-described embodiment, a user selects the English dictionary GUI 711 and then, directly inputs a search word to perform a search, but depending on circumstances, a user may input a search word after additionally selecting one of the ED1 GUI(711-1) and ED2 GUI(711-2), in which case a search result in the selected English dictionary may be provided.

Figure 8A:
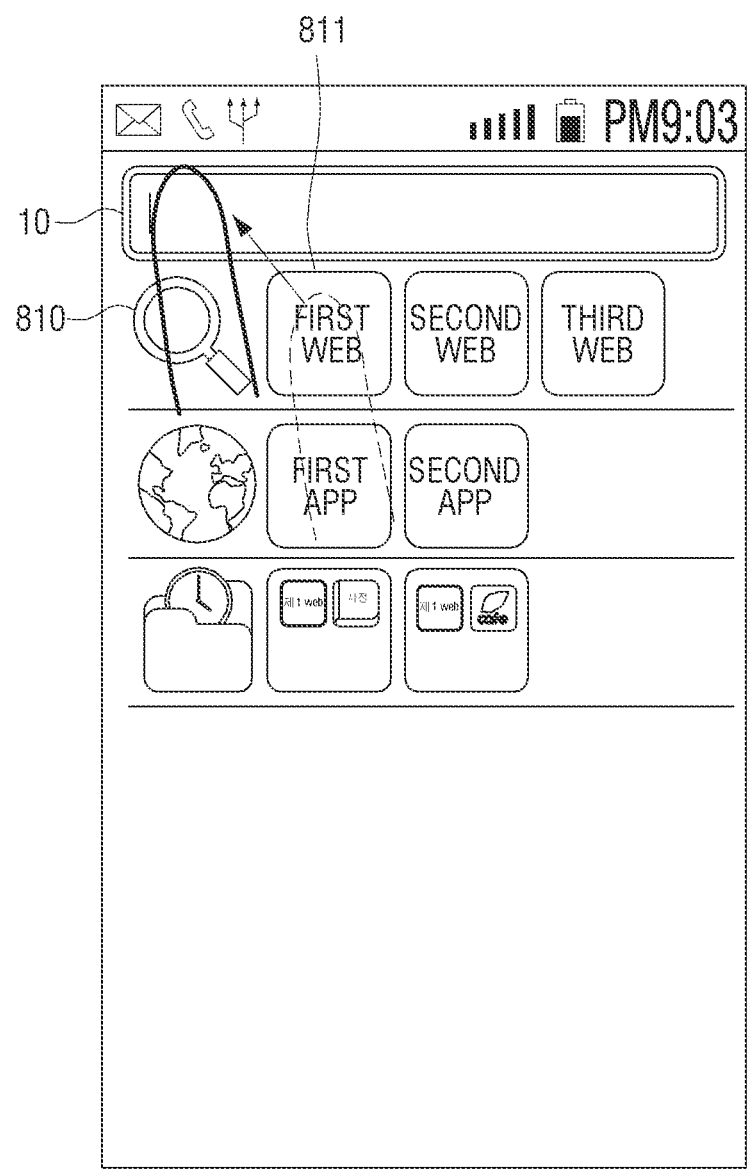
FIGS. 8A, 8B, and 8C are views provided to explain a method of providing a GUI according to an embodiment of the present disclosure.
Figure 8B:
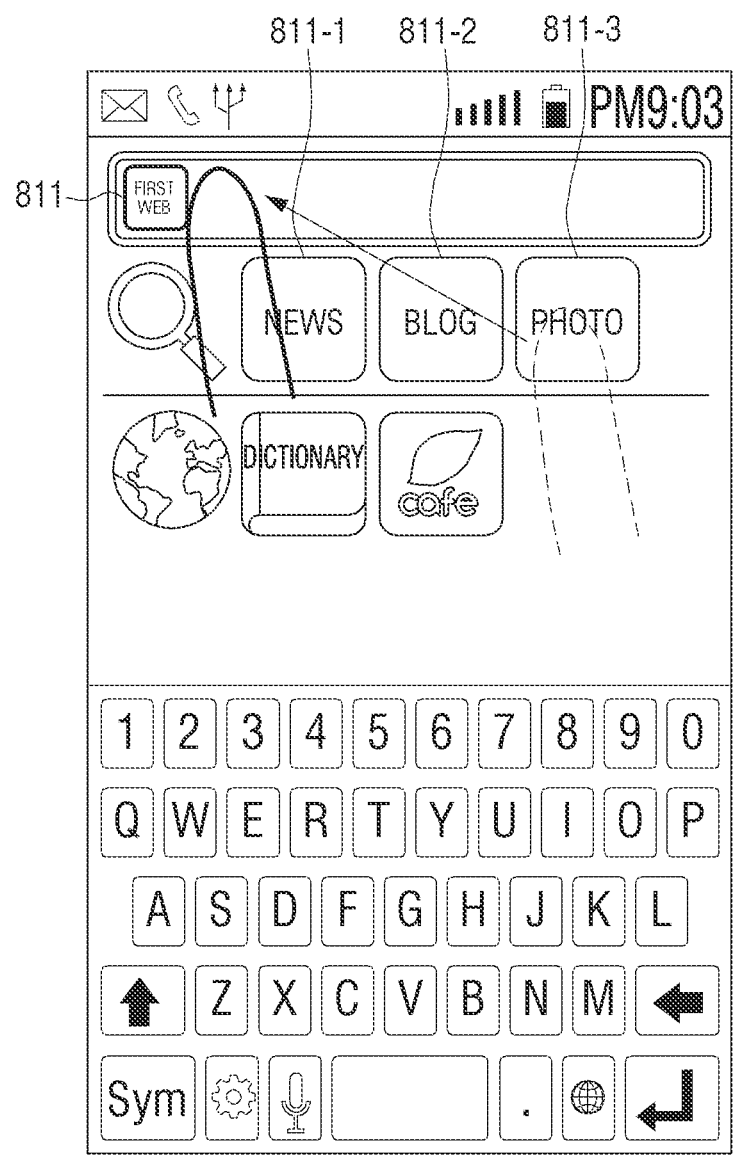
Figure 8C:
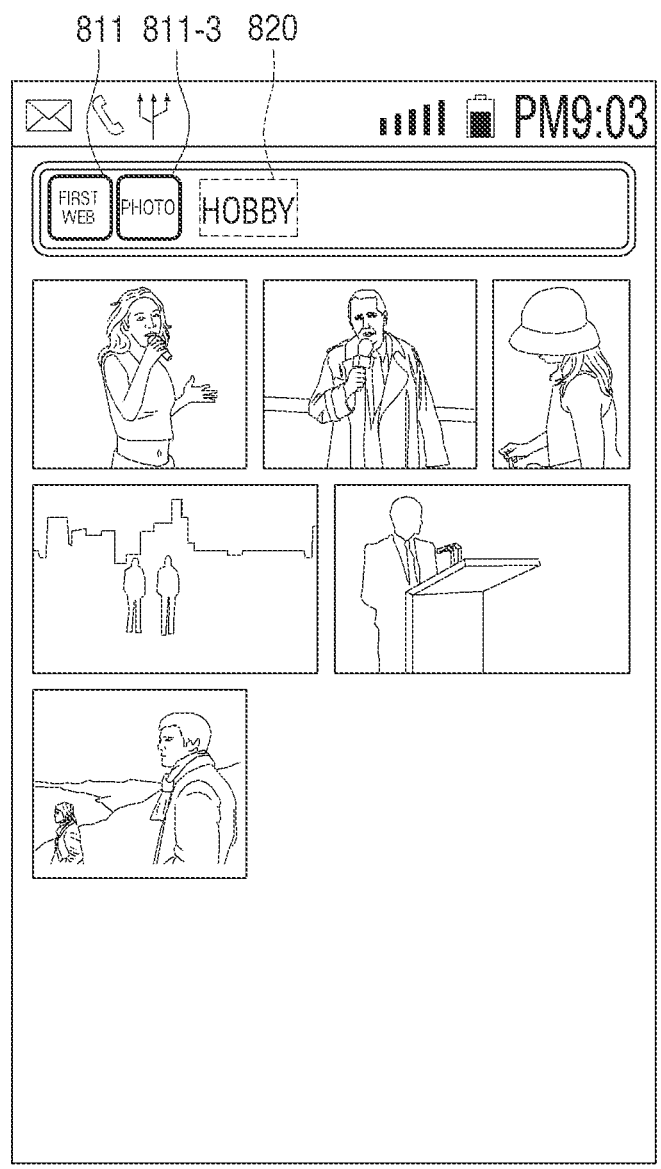

FIGS. 8A to 8C are views provided to explain a method of providing a GUI according to an embodiment of the present invention.

As illustrated in FIG. 8A, it is assumed that a first web GUI 811 representing the first web server which is included in a search domain area (referred to as 810 for convenience) is selected as illustrated in the drawing. Herein, a GUI may be selected by a user manipulation of touching the corresponding GUI 811 and dragging the GUI to the input window 10 as illustrated in FIG. 8A, but is not limited thereto.

Herein, GUIs 811-1 to 811-3 representing a sub domain of the first web server domain may be displayed as illustrated in FIG. 8B. For example, news GUI 811-1 representing a news category which belongs to the first web server, blog GUI 811-2 representing a blog category, and photo GUI 811-3 representing a photo category may be displayed.

Subsequently, when the photo GUI 811-3 is selected and input to the input window 10 and then, a search word, for example, "hobby" 820, is input as illustrated in FIG. 8C, a photo search corresponding to "hobby" may be conducted in the photo category of the first web server and the search result may be provided.

Figure 9A:
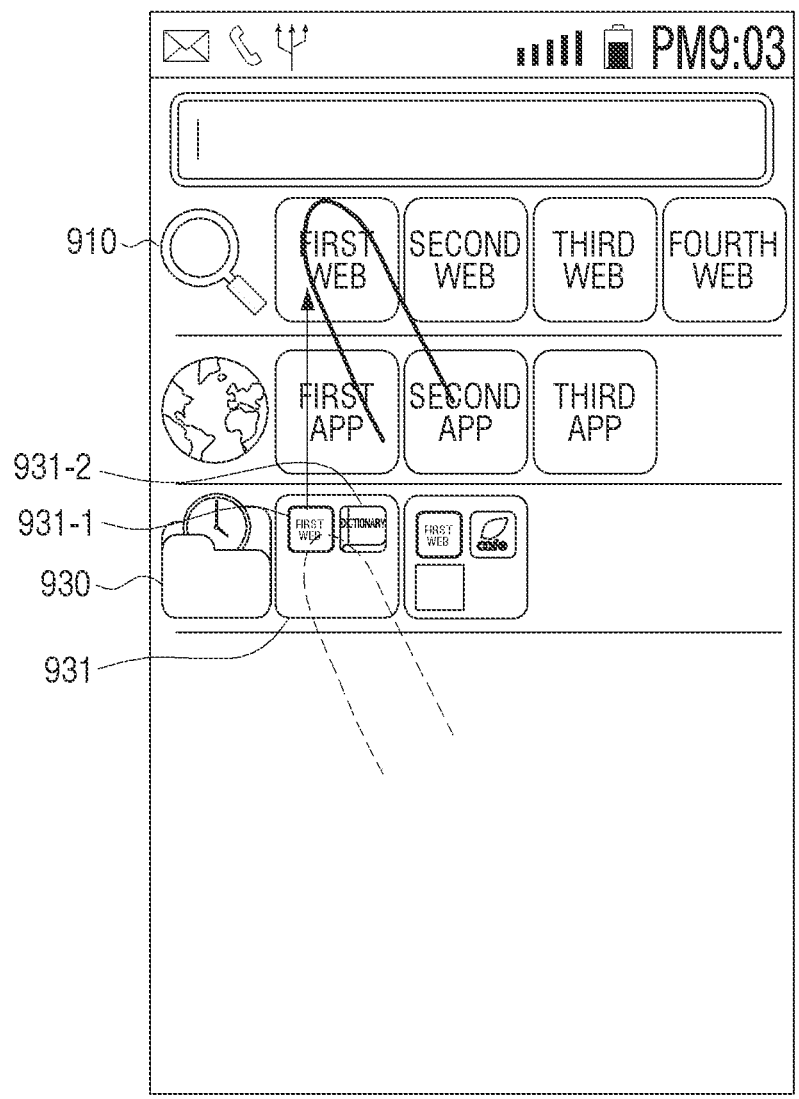
FIGS. 9A and 9B are views provided to explain a method of managing a GUI according to an embodiment of the present disclosure.
Figure 9B:
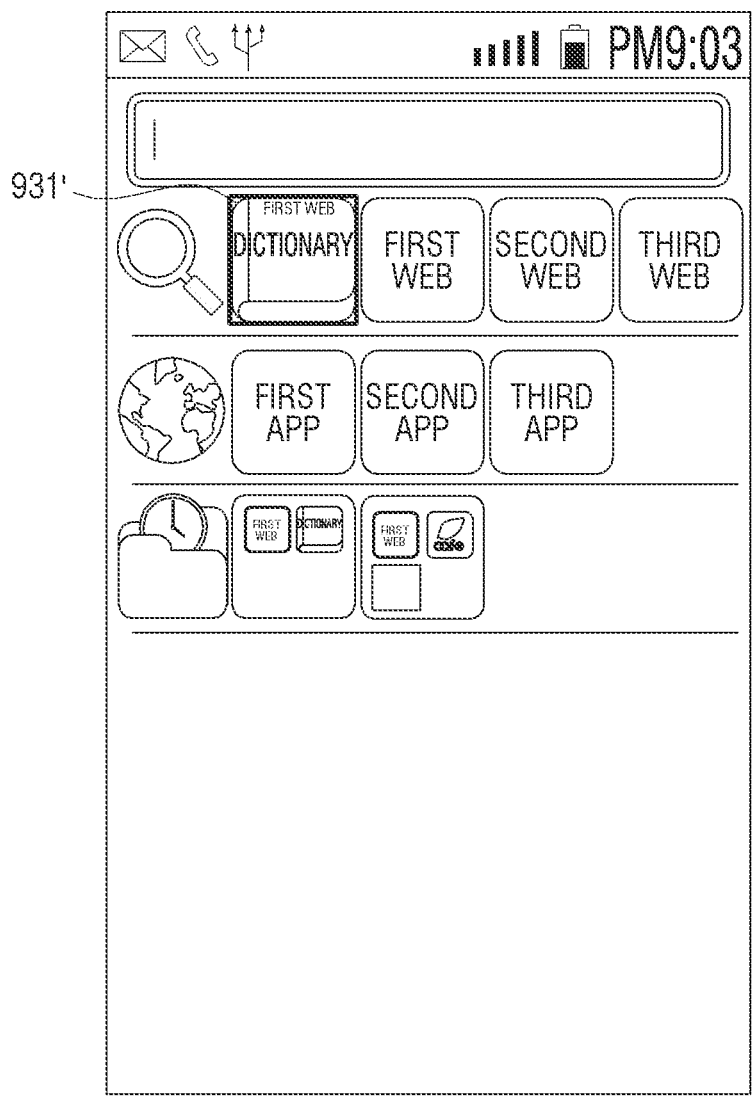

FIGS. 9A and 9B are views provided to explain a method of managing a GUI according to an embodiment of the present invention.

As illustrated in FIG. 9A, when GUI 931 in the form of folder which belongs to a user history domain area (referred to as 930 for convenience) is touched and dragged to a search domain area (referred to as 910 for convenience), GUI 931' regarding the selected folder 931 may be newly generated and added to the search domain area 910. For example, if the first web GUI 931-1 and dictionary GUI 931-2 are included in the folder GUI 931 of the user history domain area 930, and the corresponding folder is selected and moved to the search domain area 910, the GUI 931' representing the dictionary category of the first web server may be newly added to the search domain area 910.

In this case, a domain corresponding to the newly generated GUI 931', that is, the domain representing the dictionary category of the first web server, may be newly registered on a search domain. In this case, a tree structure has the domain representing the dictionary category of the first web server as a node representing a separate top level domain may be newly generated and stored. In other words, a tree structure which is generated based on a user history is managed as a temporary tree. The tree structure has a parent node and a child node which are stipulated originally, and if a user registers it in a specific domain, it is managed as a regular tree, and may be managed as an independent node which does not have a parent node and a child node. However, after a tree is registered as a regular tree, the tree may be moved to another tree, or a child node may be added based on a user's editing, a user manipulation history, etc. For example, in the above-described embodiment, if the dictionary category of the first web server is registered as an independent node of a newly generated tree, and a user adds an English dictionary category as a child node, the English dictionary category may be registered in the corresponding tree as a child node.

Figure 10A:
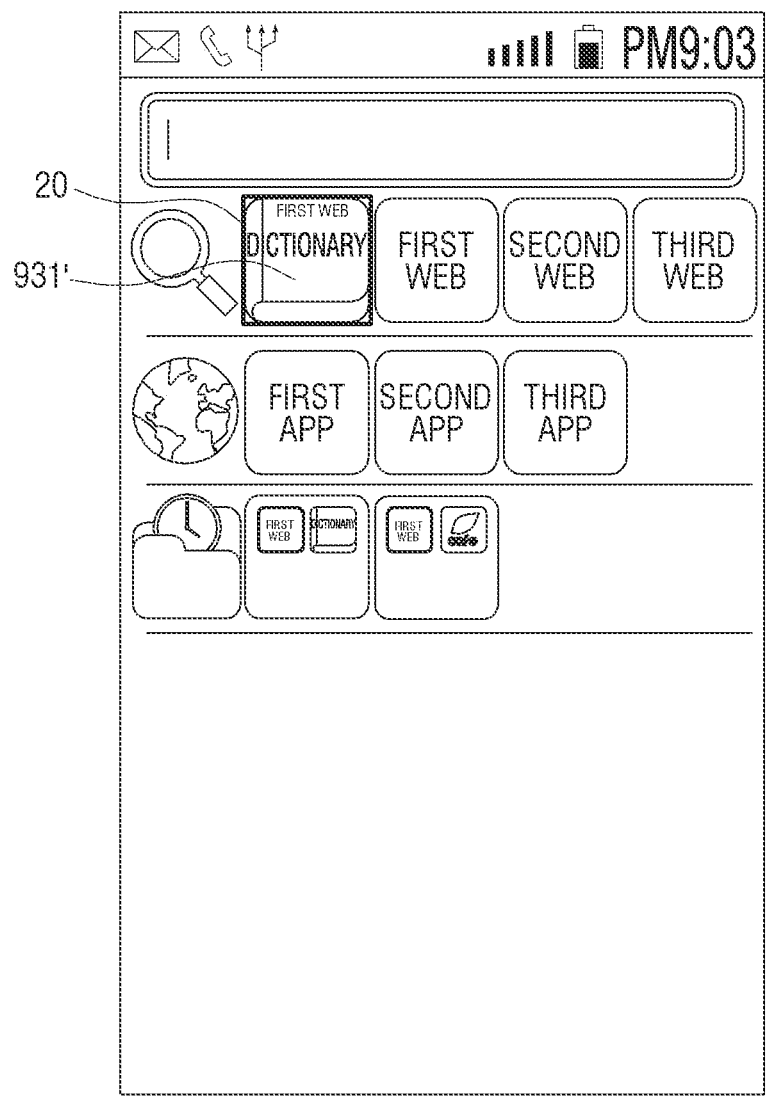
FIGS. 10A and 10B are views provided to explain a method of managing a GUI according to another embodiment of the present disclosure.
Figure 10B:
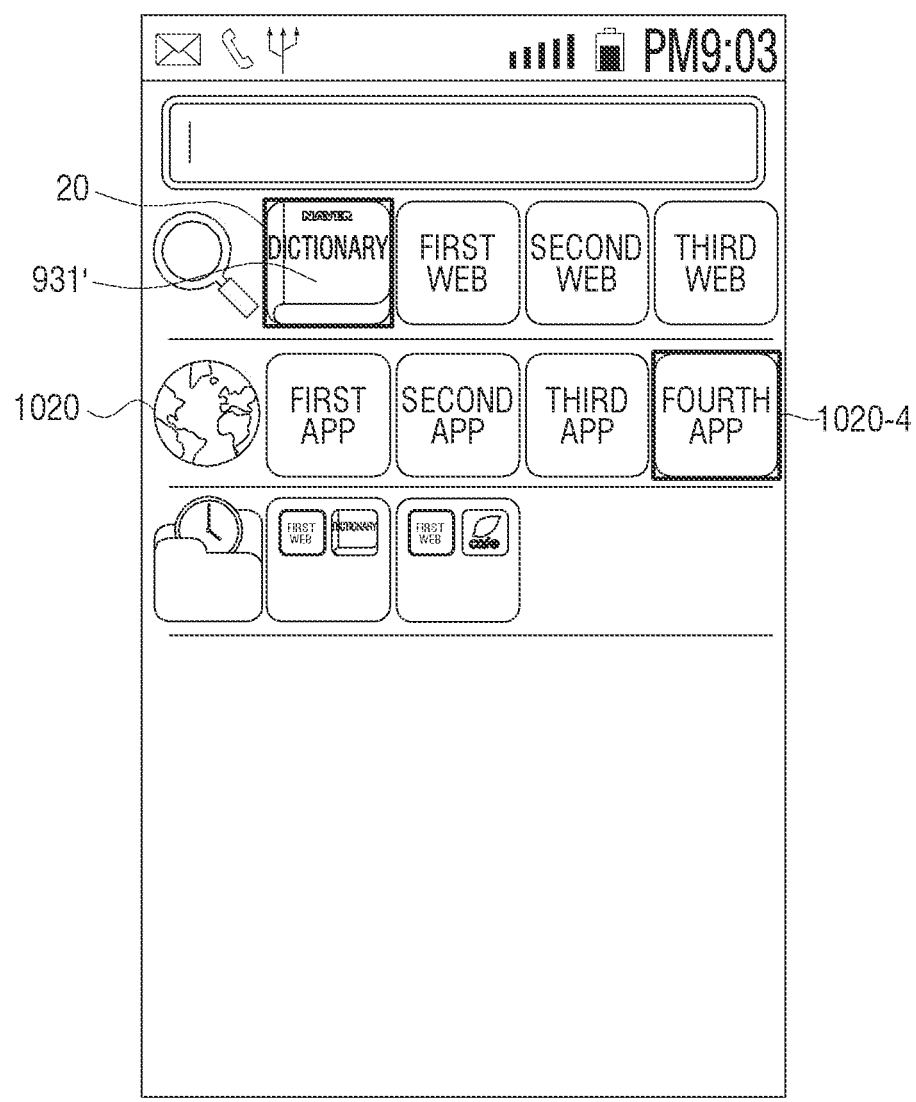

FIGS. 10A and 10B are views provided to explain a method of managing a GUI according to another embodiment of the present invention.

As illustrated in FIG. 10A, the GUI 931' which is newly registered by a user manipulation may be displayed distinctively from other GUIs. For example, it may be displayed distinctively with GUI 20 in the form of predetermined border as illustrated in the drawing, but is not limited thereto. Depending on circumstances, the GUI 931' may be displayed distinctively from other GUIs only for a predetermined time, or it may be displayed without any distinction from other GUIs according to a user's selection.

Meanwhile, a user may download and register a tree which is provided by a third party such as a service provider, other users, etc., and in this case, GUI 1020-4 corresponding to the tree may be newly generated and displayed. For example, if an application having a tree structure which is newly generated by a service provider is downloaded, GUI 1020-4 representing the corresponding application may be newly generated and displayed on an application domain area 1020.

Figure 11A:
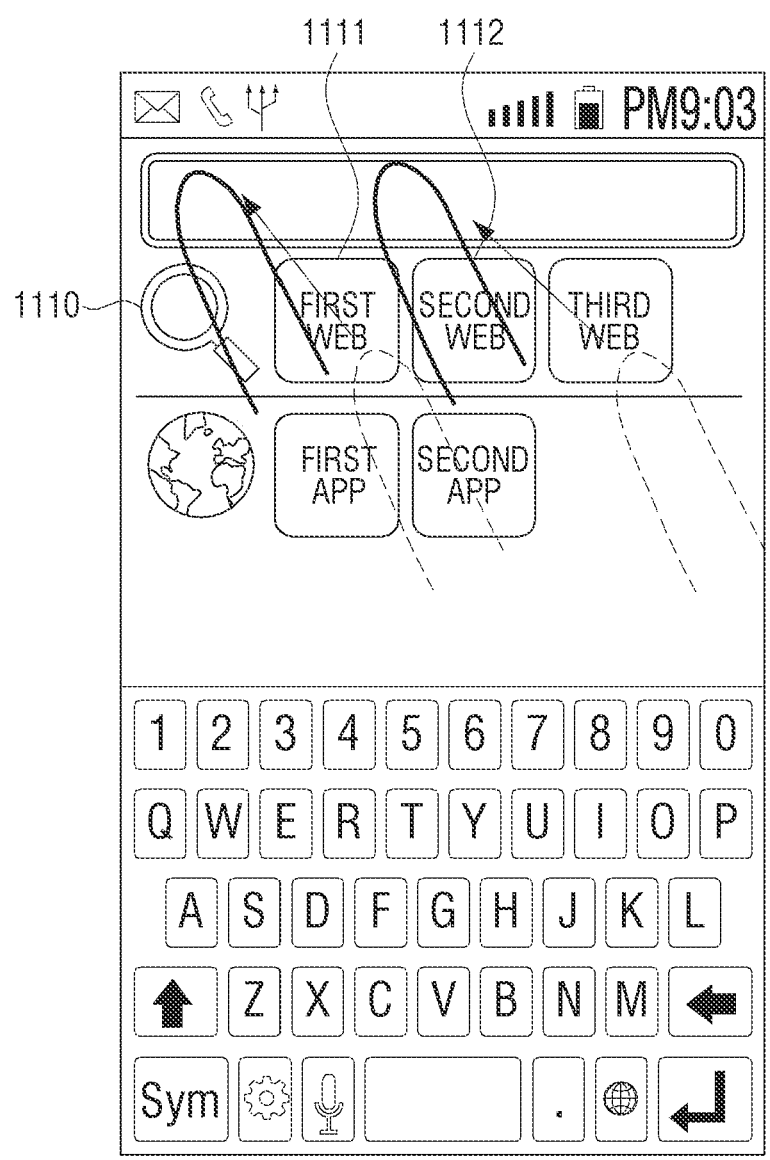
FIGS. 11A, 11B, and 11C are views provided to explain a method of providing a GUI screen according to another embodiment of the present disclosure.
Figure 11B:
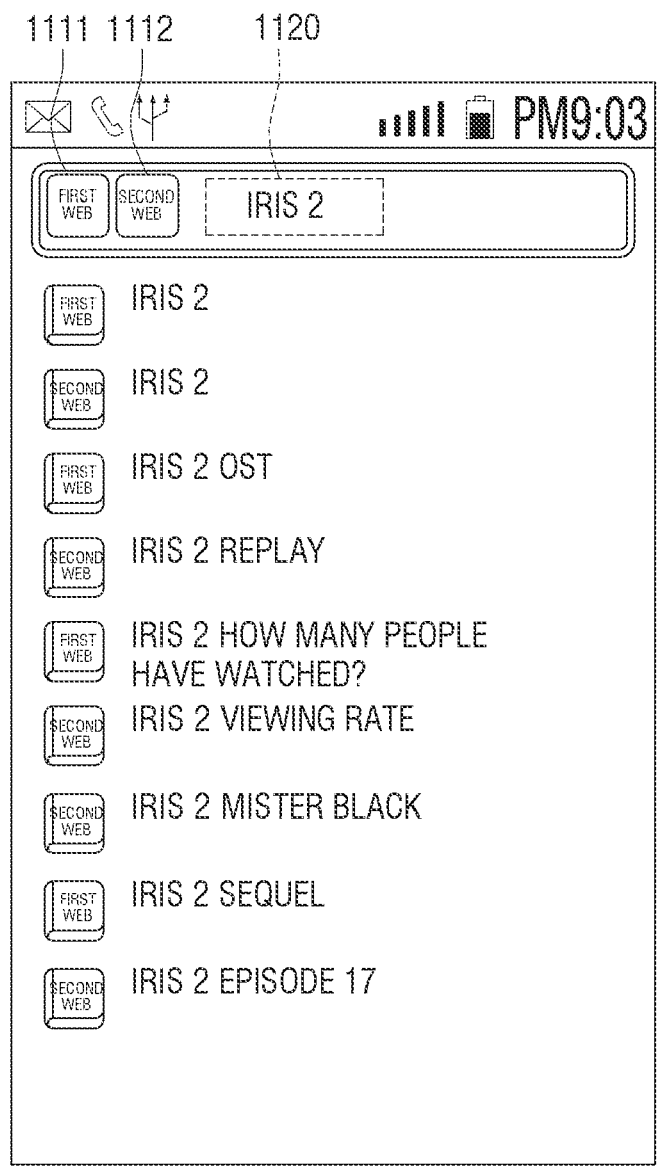
Figure 11C:
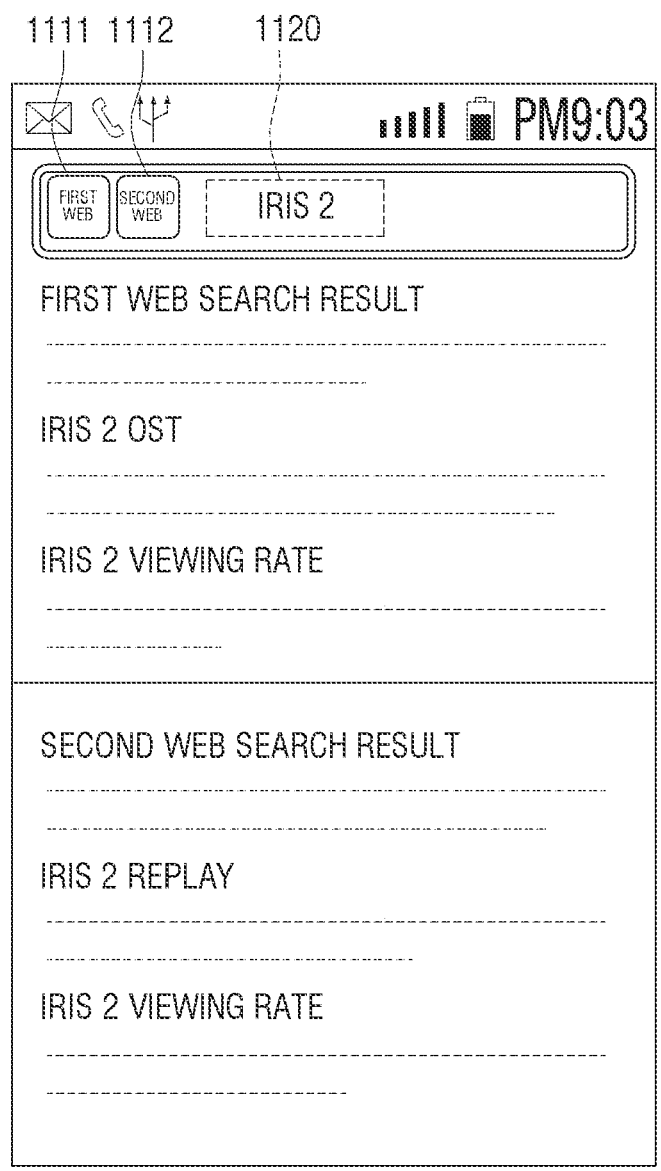

FIGS. 11A to 11C are views provided to explain a method of providing a GUI screen according to another embodiment of the present invention.

As illustrated in FIG. 11A, it is assumed that the first web GUI 1111 representing the first web server included in a search domain area 1110 and the second web GUI 1112 representing the second web server are selected sequentially (or simultaneously).

As illustrated in FIG. 11B, if the first web GUI 1111 and the second web GUI 1112 are selected, and part of a search word is input, a search word 1120 which can be searched in the first web server and the second web server may be completed and provided automatically according to an automatic search word completion function. In this case, the search word 1120 which can be searched in the first web server and the second web server, respectively, may be displayed distinctively. Subsequently, one of the provided search words is selected, a search result based on the selected web server and the selected search word may be provided.

In addition, as illustrated in FIG. 11C, if the first web GUI 1111 and the second web GUI 1112 are selected and a search word 1120 is input, a search result in the first web server and the second web server may be provided distinctively.

Figure 12A:
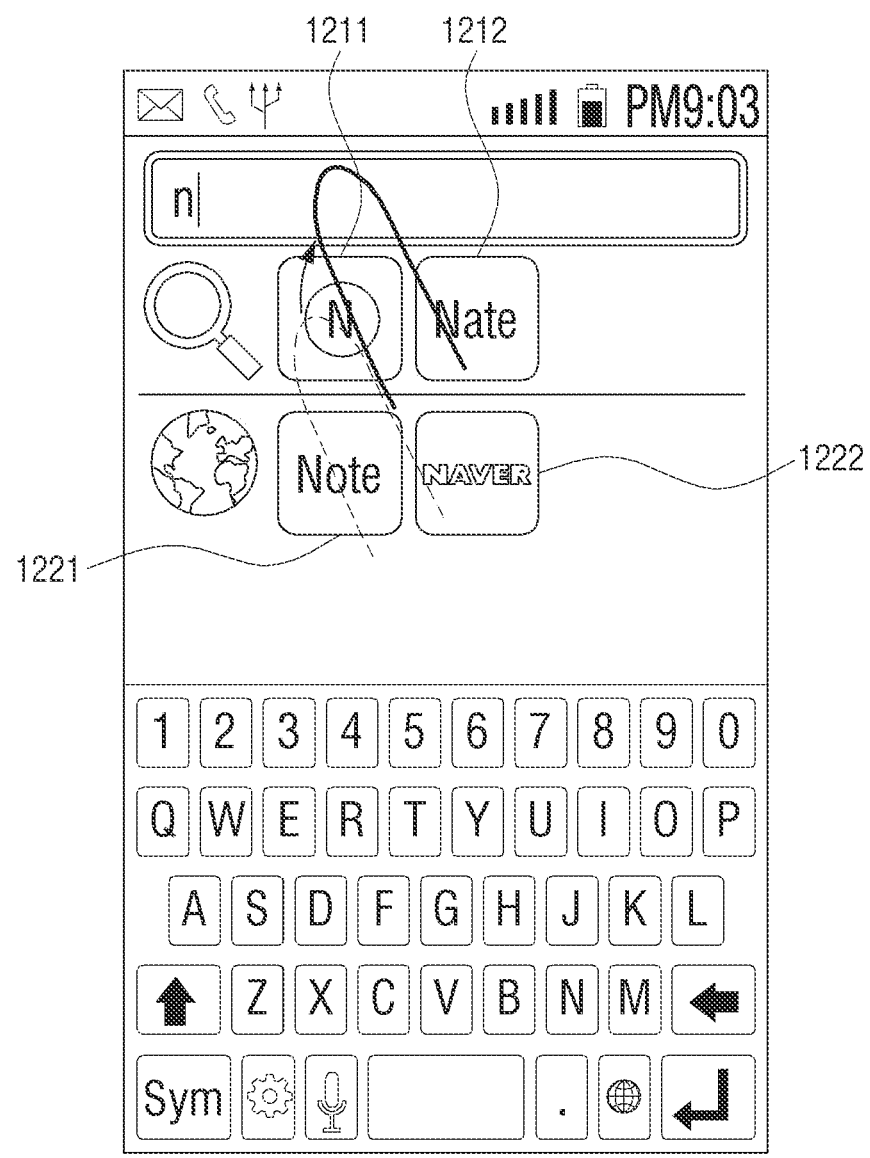
FIGS. 12A, 12B, and 12C are views provided to explain a search method according to various embodiments of the present disclosure.
Figure 12B:
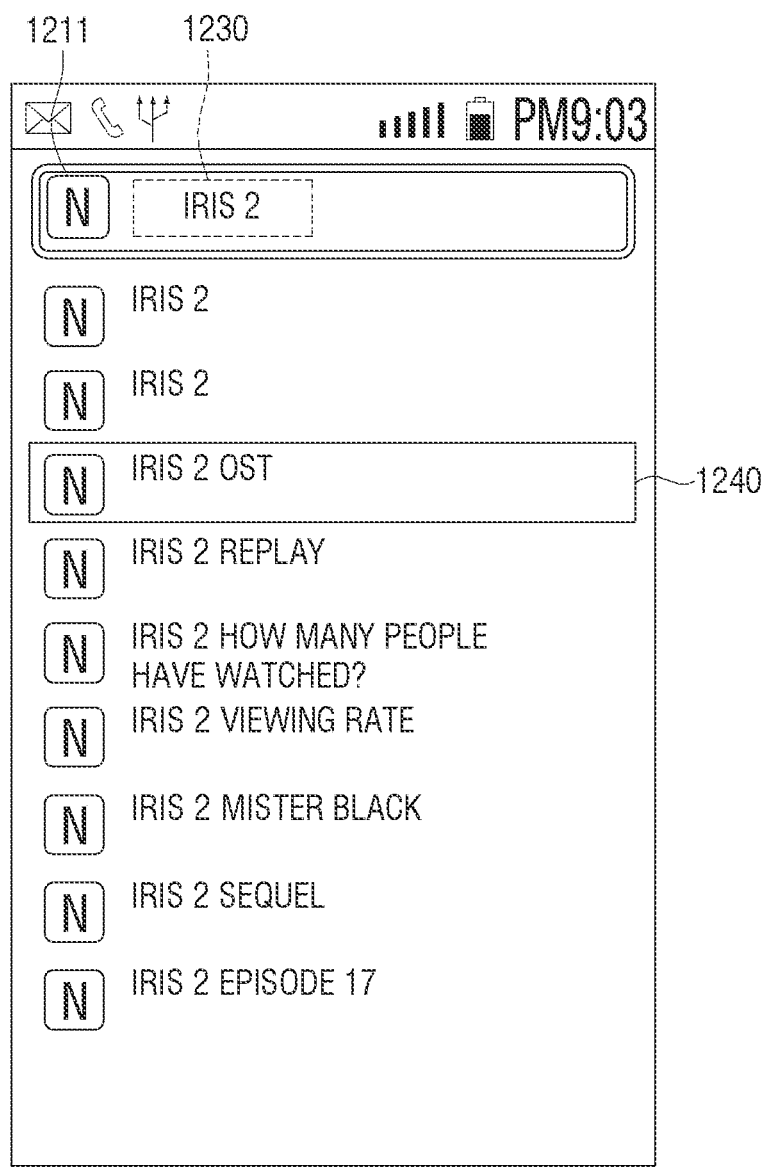
Figure 12C:
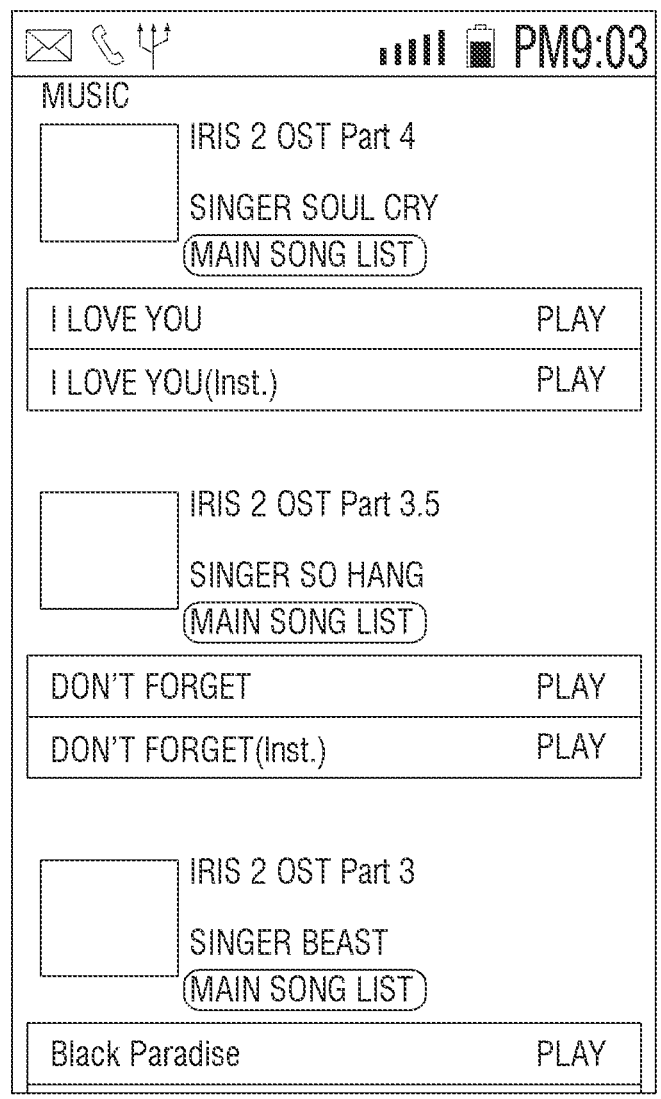

FIGS. 12A to 12C are views provided to explain a method of providing a GUI screen according to another embodiment of the present disclosure.

As illustrated in FIG. 12A, if part of a text to select a sub domain is input, GUIs 1211, 1212, 1221, 1222 representing sub domains including the input part of the text may be filtered and provided automatically. For example, if "n" is input as illustrated in the drawing, web servers, applications, etc. which are related to "n" from among available sub domains such as pre-stored web servers, applications, etc. may be filtered and provided.

Subsequently, if a user selects GUI 1211 representing "Naver" and inputs part of a search word 1230, a search word which can be searched in the server, "Naver", may be completed and provided automatically according to an automatic search word completion function.

Subsequently, if one of the provided search words is selected, such as provided search word 1240, a search result based on the selected web server and the selected search word may be provided as illustrated in FIG. 12C.

Figure 13A:
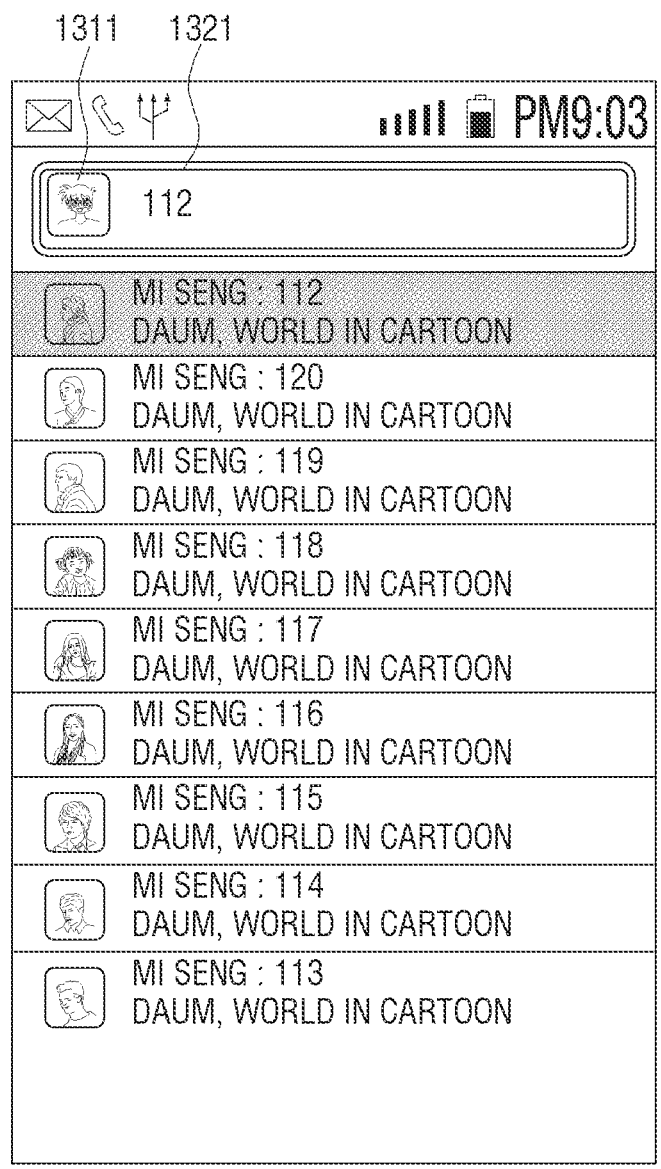
FIGS. 13A and 13B are views provided to explain a method of providing an application-based GUI according to an embodiment of the present disclosure.
Figure 13B:
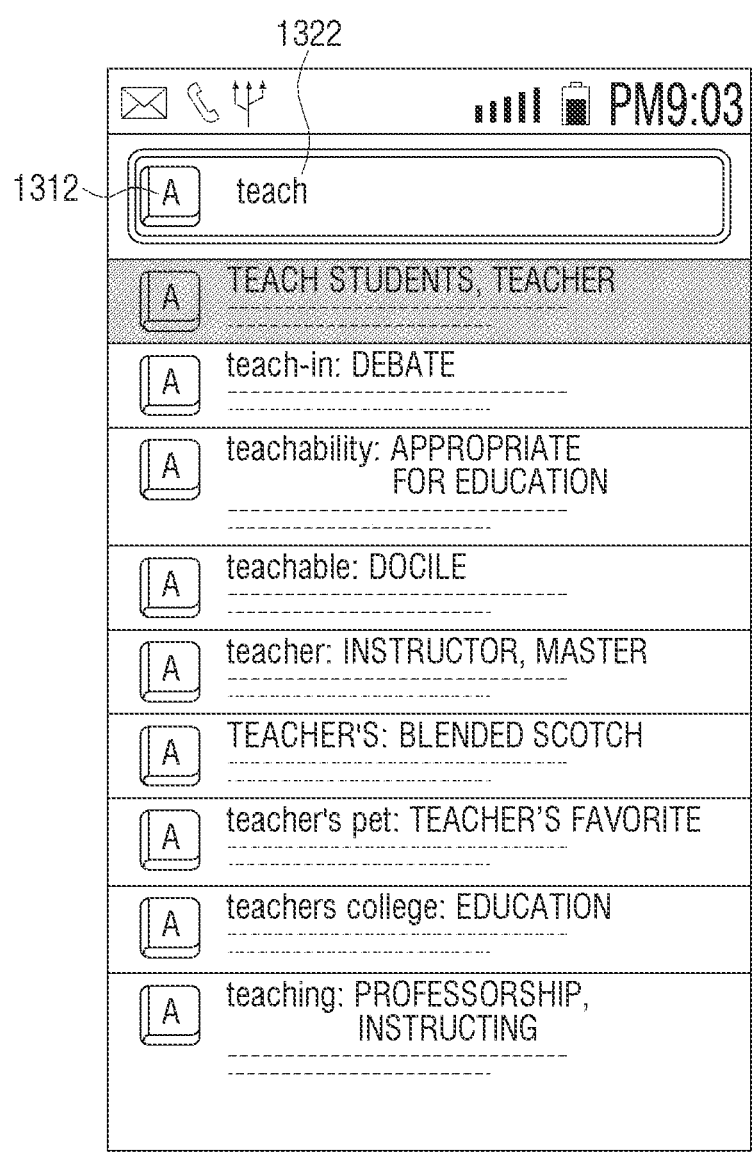

FIGS. 13A and 13B are views provided to explain a method of providing a GUI screen according to another embodiment of the present invention.

As illustrated in FIGS. 13A and 13B, a web service corresponding to a search word may be available immediately, or a preview of a web content corresponding to a search word may be provided through a GUI according to an embodiment.

As illustrated in FIG. 13A, if GUI 1311 representing a specific web content provided in series is selected, and a user inputs a desired episode 1321 in text, a web service corresponding to the desired episode of the content may be provided directly.

That is, if GUI 1311 representing a specific web content is selected, various series contents corresponding to the web content may be provided in the form of list as illustrated in the drawing, and if a user inputs a desired episode in text, a sub content corresponding to the episode may be provided (for example, be played) immediately.

As illustrated in FIG. 13B, if GUI 1312 representing an English dictionary category is selected and then, part of a search word 1322 is input, a search result corresponding to the part of a search word 1322 may be provided in the form of preview. Subsequently, if a search word is confirmed and input, a detailed search result corresponding to the confirmed search word may be provided.

Figure 14A:
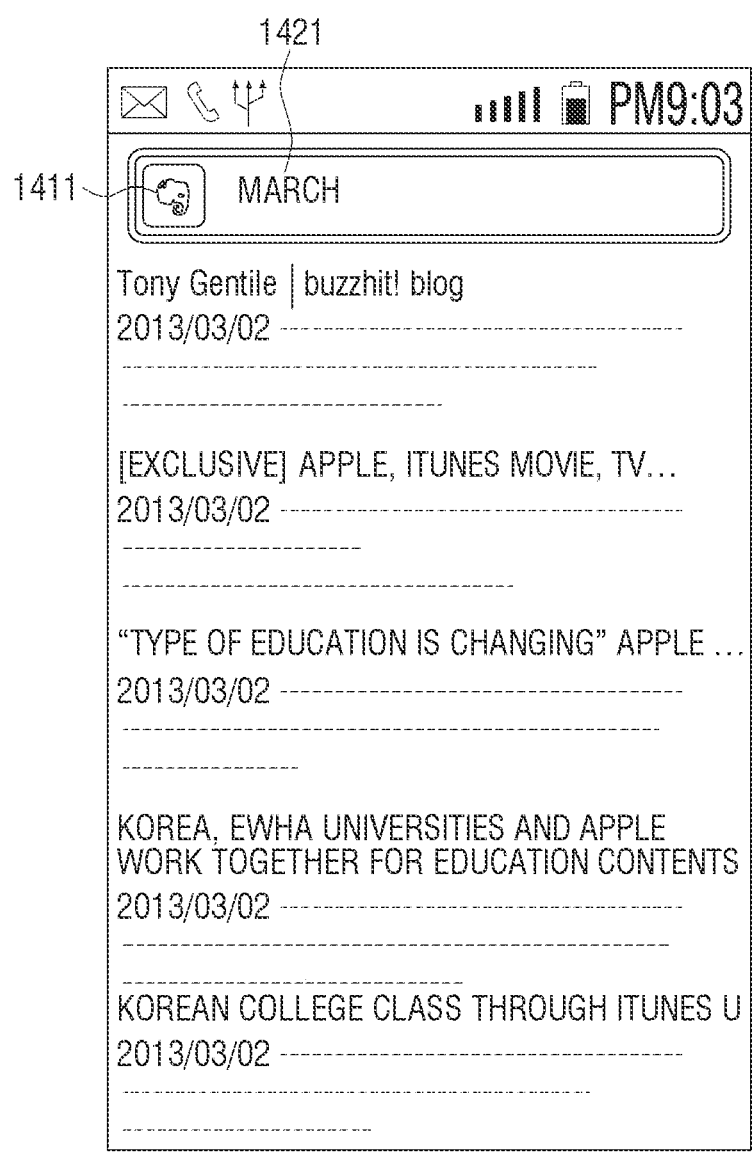
FIGS. 14A and 14B are views provided to explain a method of providing an application-based GUI according to another embodiment of the present disclosure.
Figure 14B:
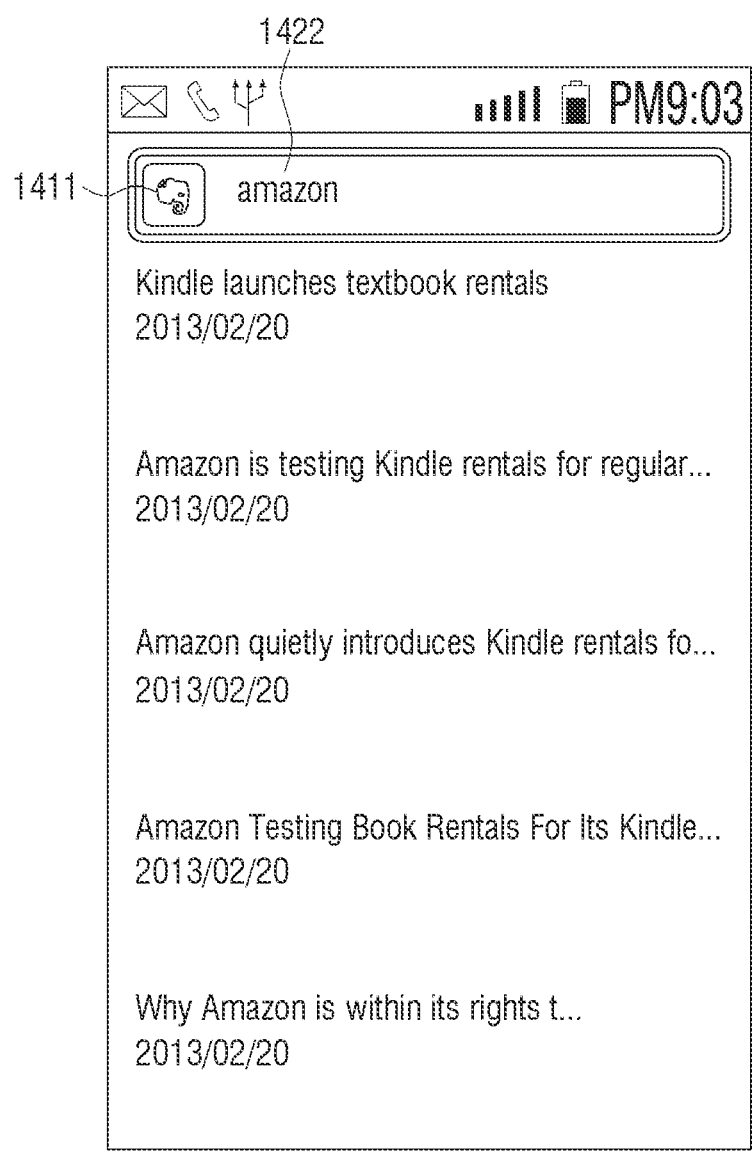

FIGS. 14A to 14B are views provided to explain a method of providing a GUI screen according to another embodiment of the present invention.

As illustrated in FIGS. 14A and 14B, if GUI 1411 representing a record application and a specific search word 1421 is input, a content corresponding to the search word 1421 is searched and provided in the form of preview.

For example, if GUI 1411 representing a specific note application is selected on a GUI screen as illustrated in FIG. 5A and the specific search word 1421, e.g., "March", is input, a note which is written in March may be searched and provided in the form of preview.

In another example, if GUI 1411 representing a specific note application is selected as illustrated in FIG. 14B and the specific search word 1422, e.g., "amazon", is input, a note including "amazon" may be searched and provided in the form of preview.

In this case, the title, contents and tag of the note may be searched, and the image stored in the note and the texts in an attached file may also be searched. Accordingly, the contents corresponding to search words 1421 and 1422 may be provided in the form of preview.

Figure 15A:
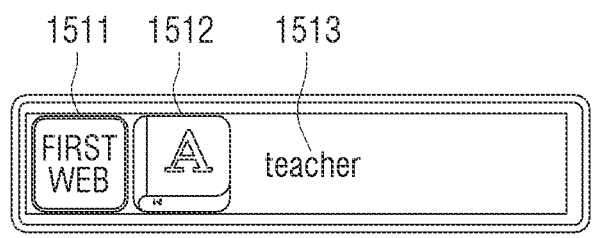
FIGS. 15A, 15B, and 15C are views provided to explain a search method according to various embodiments of the present disclosure.
Figure 15B:
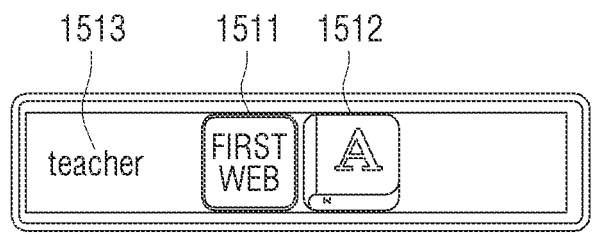
Figure 15C:
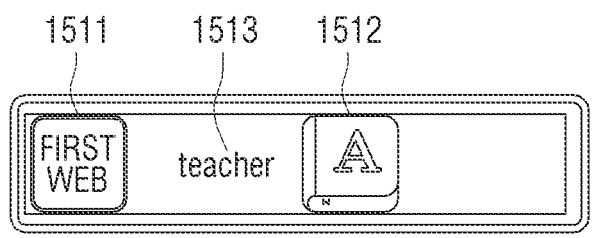

FIGS. 15A to 15C are views provided to explain a search method according to various embodiments of the present invention.

FIG. 15A illustrates a domain priority method according to an embodiment of the present invention, and an upper domain 1511 and a lower domain 1512 may be selected sequentially and then, a search word 1513 may be input. In this case, a search corresponding to the search word 1513 which is input regarding the sub domain that is selected right before the search word is input may be performed.

FIG. 15B illustrates a search word priority method according to another embodiment of the present invention, and an upper domain 1511 and a lower domain 1512 may be selected sequentially after a search word 1513 is input. In this case, a search corresponding to the search word 1513 which is input regarding the sub domain that is selected for the last time may be performed.

FIG. 15C illustrates a hybrid method according to another embodiment of the present invention, and the hybrid method is a method which combines the above-described search word priority method and the domain priority method. According to the hybrid method, an upper domain 1511 is selected, a search word 1513 is input, and a lower domain 1512 is selected. In this case, a search corresponding to the search word 1513 which is input regarding the sub domain that is selected for the last time may also be performed.

Figure 16A:
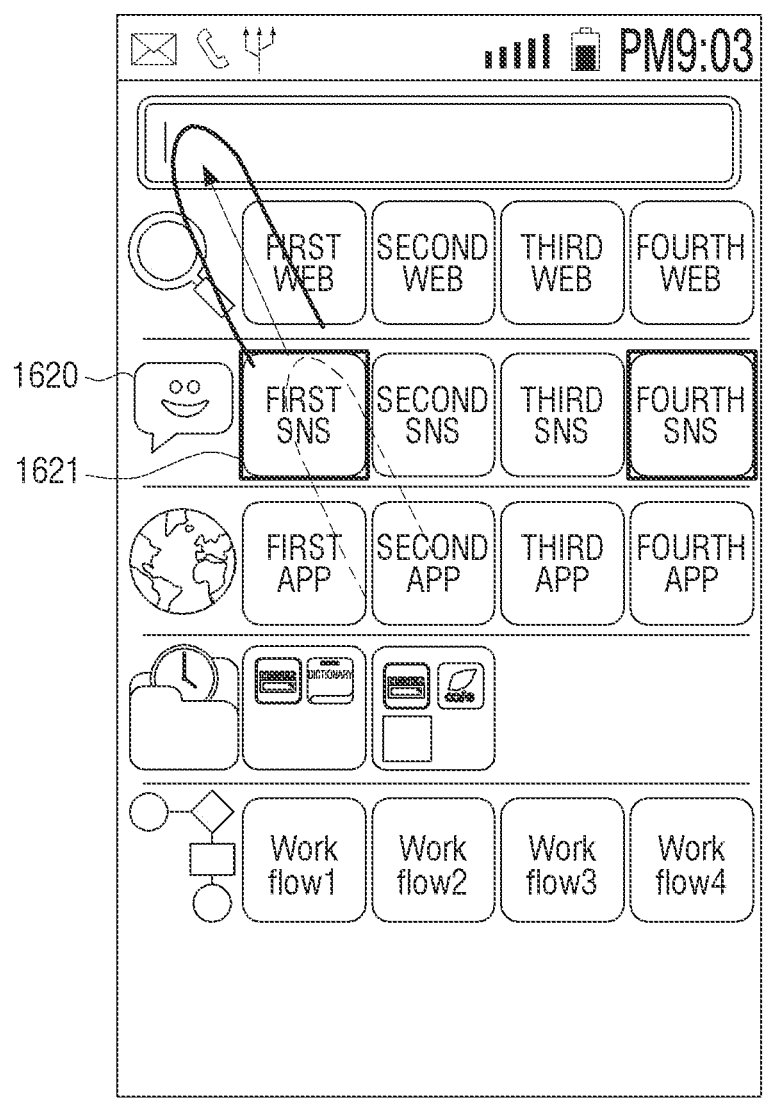
FIGS. 16A, 16B, and 16C are views provided to explain a method of providing a GUI according to another embodiment of the present disclosure.
Figure 16B:
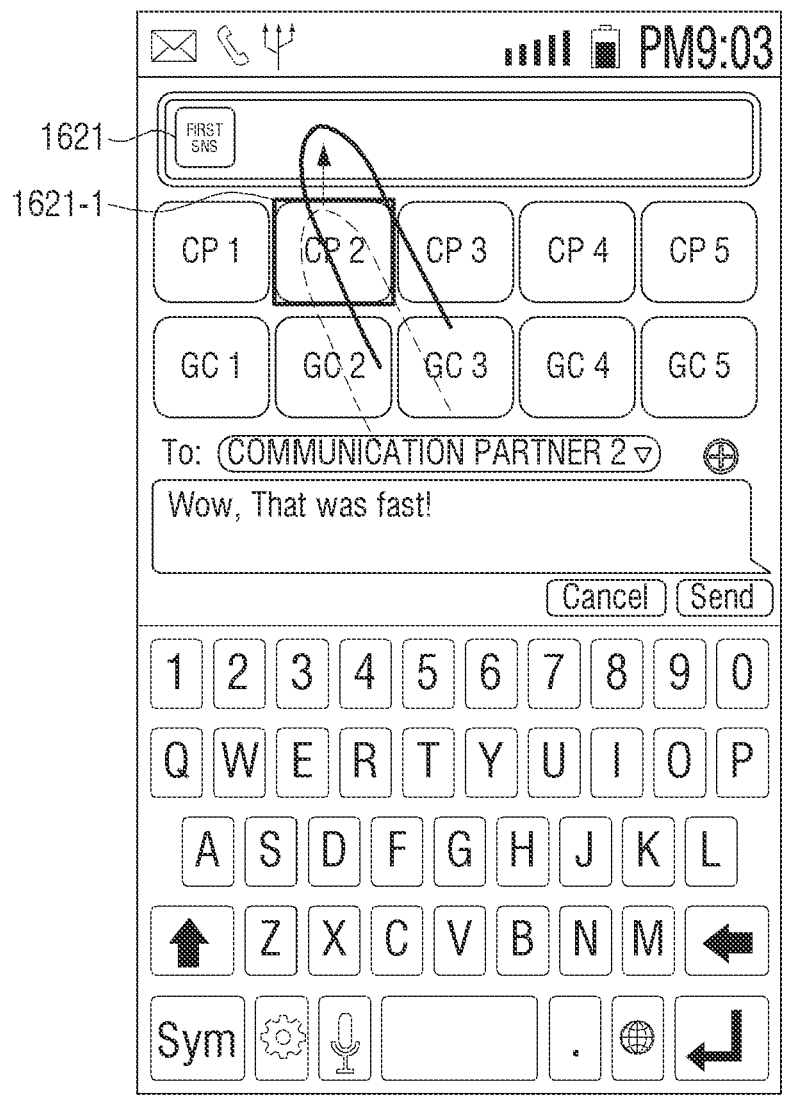
Figure 16C:
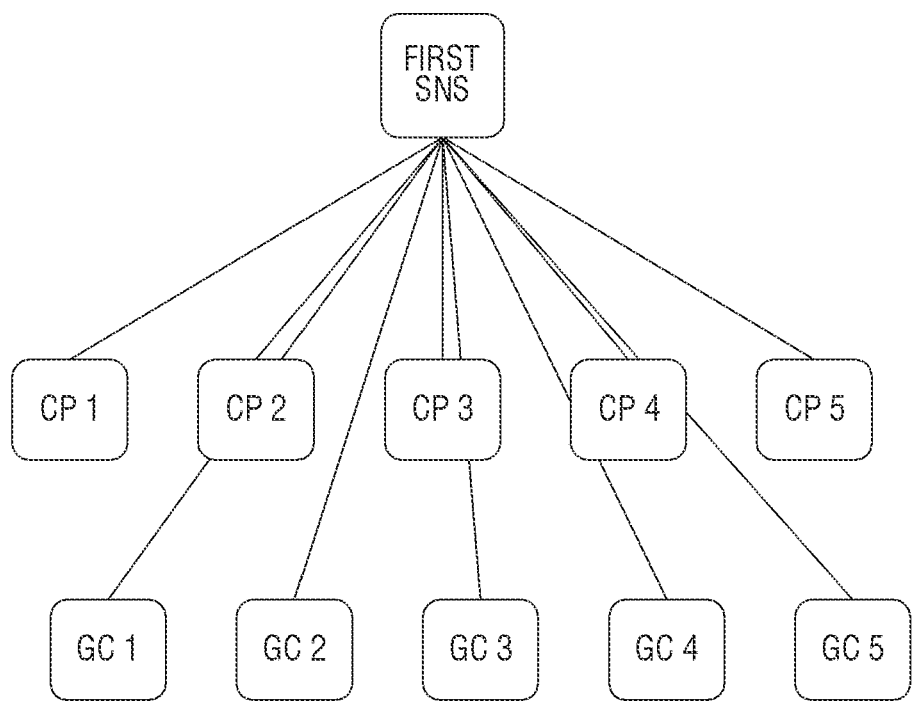

FIGS. 16A to 16C are views provided to explain a method of providing a GUI according to another embodiment of the present invention.

As illustrated in FIG. 16A, if GUI 1621 representing the a Social Network Service (SNS) application 1621 which belongs to SNS domain 1620 is selected, information regarding communication partners registered in the first SNS server may be provided in the form of GUI. Subsequently, if GUI 1621-1 representing communication partner 2 is selected, a communication window with communication partner 2 may be provided. That is, in the case of an application, the corresponding function may be performed based on the selected contents even if no text is input.

Meanwhile, the GUI screen illustrated in FIGS. 16A and 16B may be provided based on a tree structure as illustrated in FIG. 16C. That is, the first SNS node may have a communication partner node and a communication group node as sub nodes, based on this, a GUI screen may be provided, and when a GUI is selected on the GUI screen, a corresponding function may be performed based on information linked to each node of the tree structure.

Figure 17A:
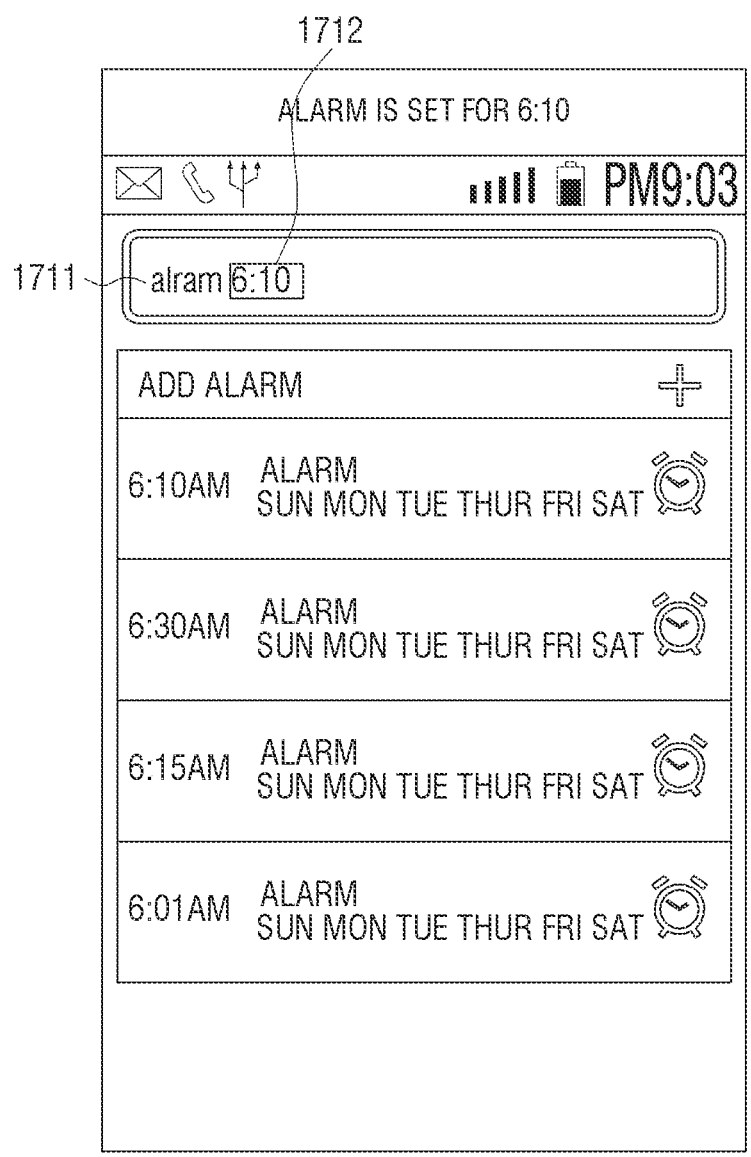
FIGS. 17A, 17B, and 17C illustrate a corresponding detailed function executed by inputting the tile and detailed function of a desired application in the form of text according to an embodiment of the present disclosure.
Figure 17B:
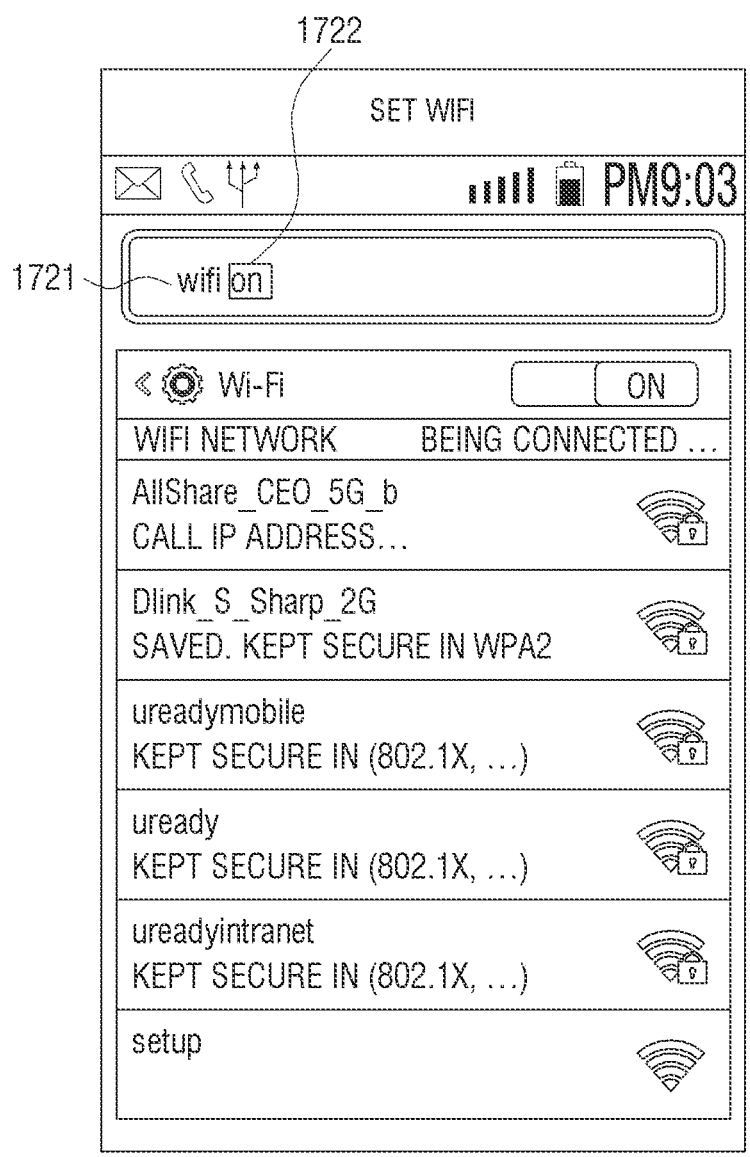
Figure 17C:
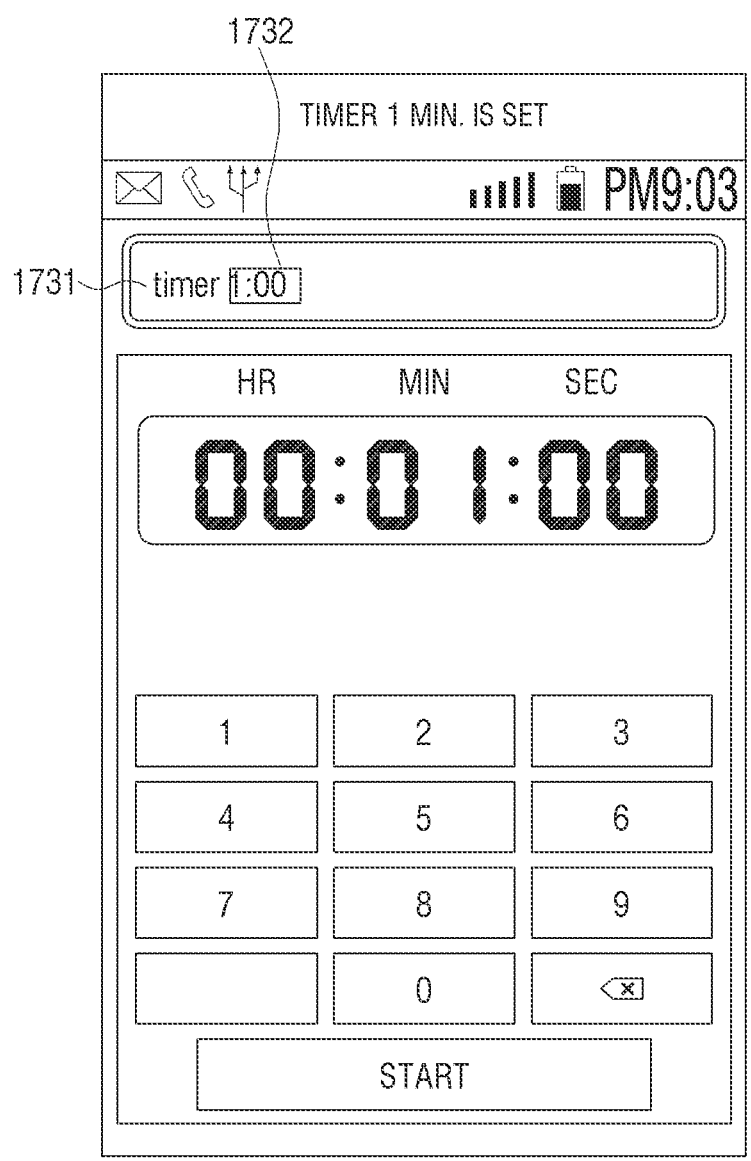

FIGS. 17A to 17C are views provided to explain a method of providing a GUI according to another embodiment of the present invention.

As illustrated in FIGS. 17A to 17C, a corresponding detailed function may be executed by inputting the tile and detailed function of a desired application in the form of text.

For example, if a user wishes to execute an alarm function as illustrated in FIG. 17A, the user may input the texts of "alarm" 1711 and "6:10" 1712 so as to execute the alarm function at the input time.

In another example, if a user wishes to execute a WiFi function as illustrated in FIG. 17B, the user may input the texts of "wifi" 1721 and "on" 1722, the input function may be performed automatically.

In another example, if a user wishes to execute a timer function as illustrated in FIG. 17C, the user may input the texts of "timer" 1731 and "1:00" 1732 which is a desired time, the timer function may be performed automatically.

Figure 18A:
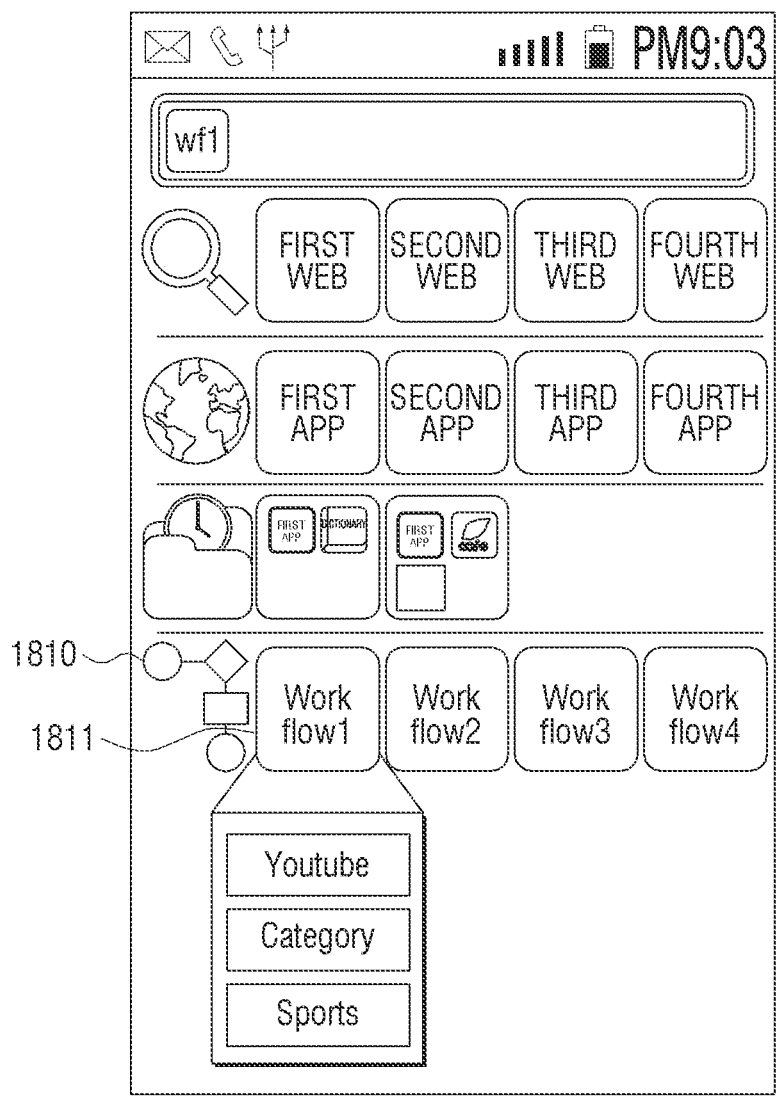
FIGS. 18A and 18B are views provided to explain a method of providing a GUI according to another embodiment of the present disclosure.
Figure 18B:
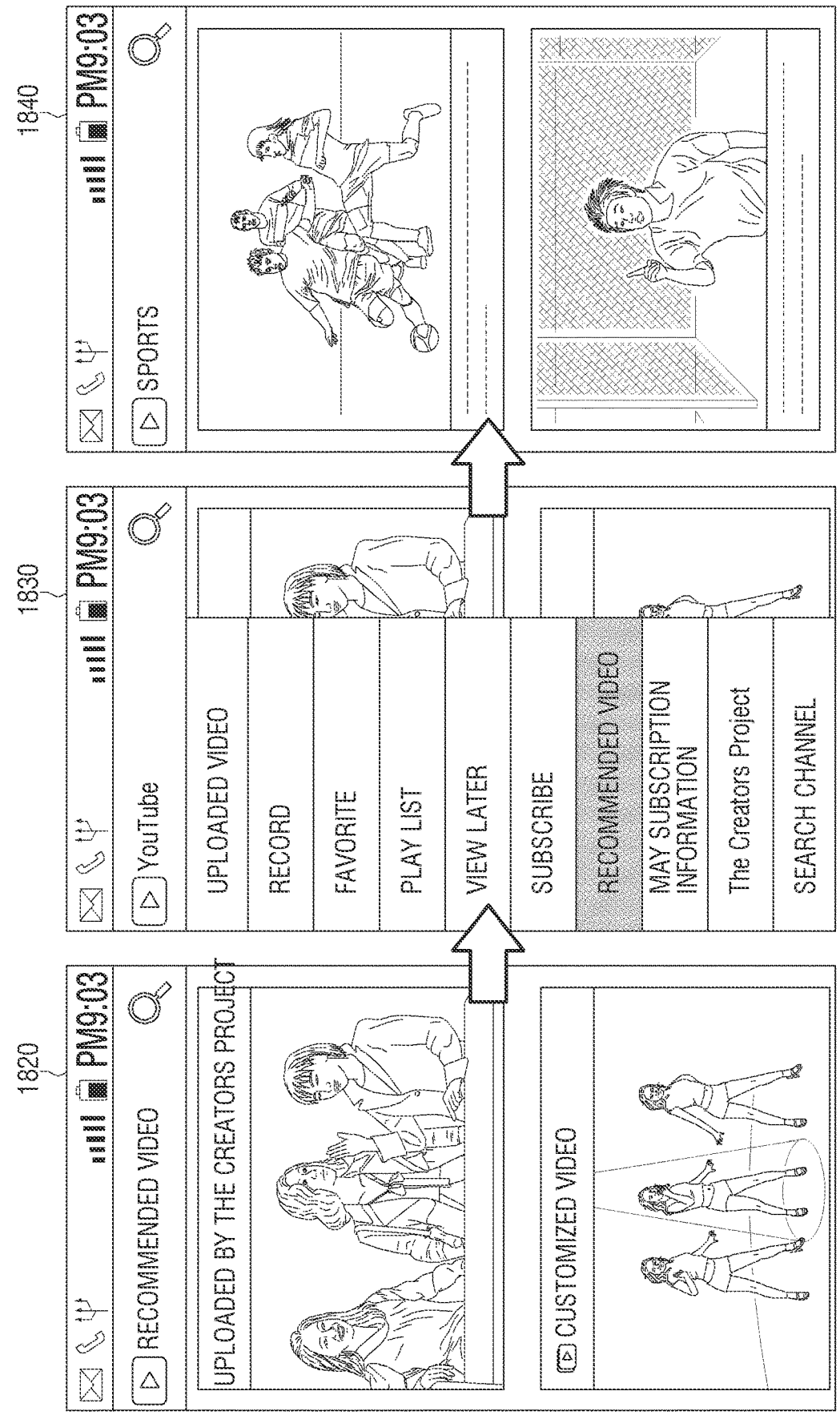

FIGS. 18A and 18B are views provided to explain a method of providing a GUI according to another embodiment of the present invention.

As illustrated in FIG. 18A, if GUI 1811 representing a specific "work flow 1" is selected in a work flow domain 1810, a corresponding execution screen may be provided immediately based on a history included in the work flow 1. That is, an execution screen 1840 which comes in for the last time of FIG. 18B may be provided immediately.

Specifically, the last execution screen 1840 which is generally provided after the first and second execution screens 1820, 1830 of FIG. 18B are provided may be provided immediately as the GUI 1811 representing the specific "work flow 1" is selected.

Figure 19A:
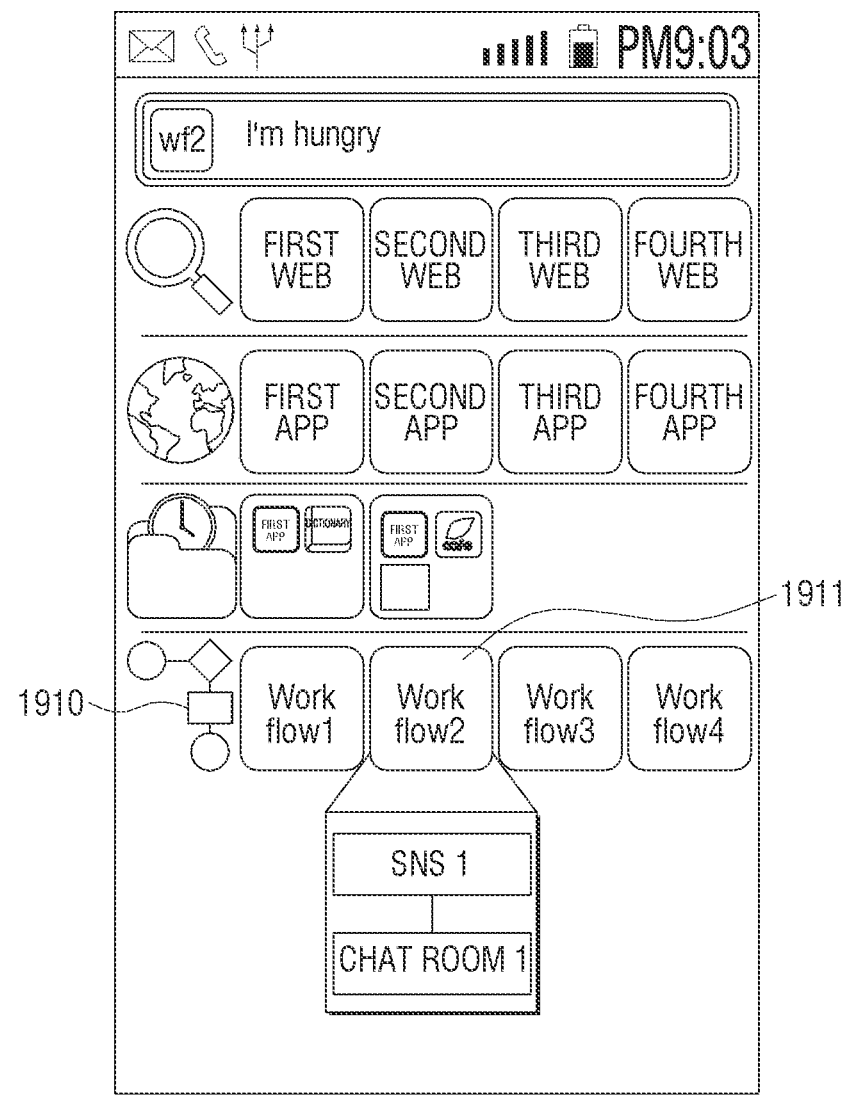
FIGS. 19A and 19B are views provided to explain a method of providing a GUI according to another embodiment of the present disclosure.
Figure 19B:
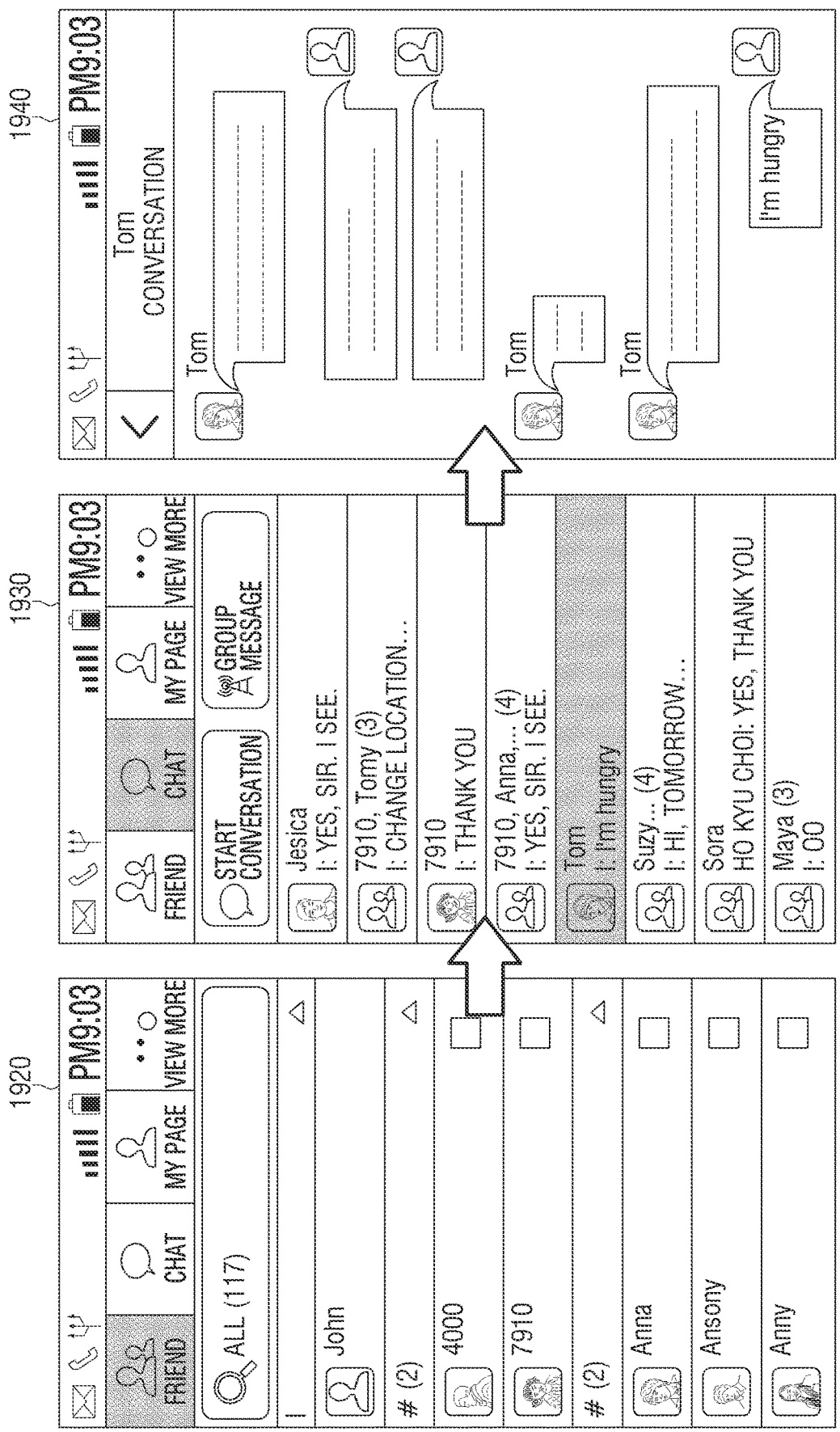

FIGS. 19A and 19B are views provided to explain a method of providing a GUI according to another embodiment of the present invention.

As illustrated in FIG. 19A, if GUI 1911 representing a specific "work flow 2" is selected in a work flow domain 1910, an execution screen corresponding to a history included in the work flow 2 may be provided immediately. That is, an execution screen 1940 which comes in for the last time of FIG. 19B may be provided immediately.

Specifically, the last execution screen 1940 which is generally provided after the first and second execution screens 1920, 1930 of FIG. 19B are provided may be provided immediately as the GUI 1911 representing the specific "work flow 2" is selected. In particular, if the GUI 1911 representing "work flow 2" is selected and then, a dialog is input, a specific chat room execution screen which is selected by the GUI 1911 is displayed and the corresponding conversation may be input automatically. In this case, a sub menu of the corresponding application regarding the selection of the GUI 1911 may be executed immediately using data which is necessary to execute the corresponding application, such as parameter.

Figure 20:
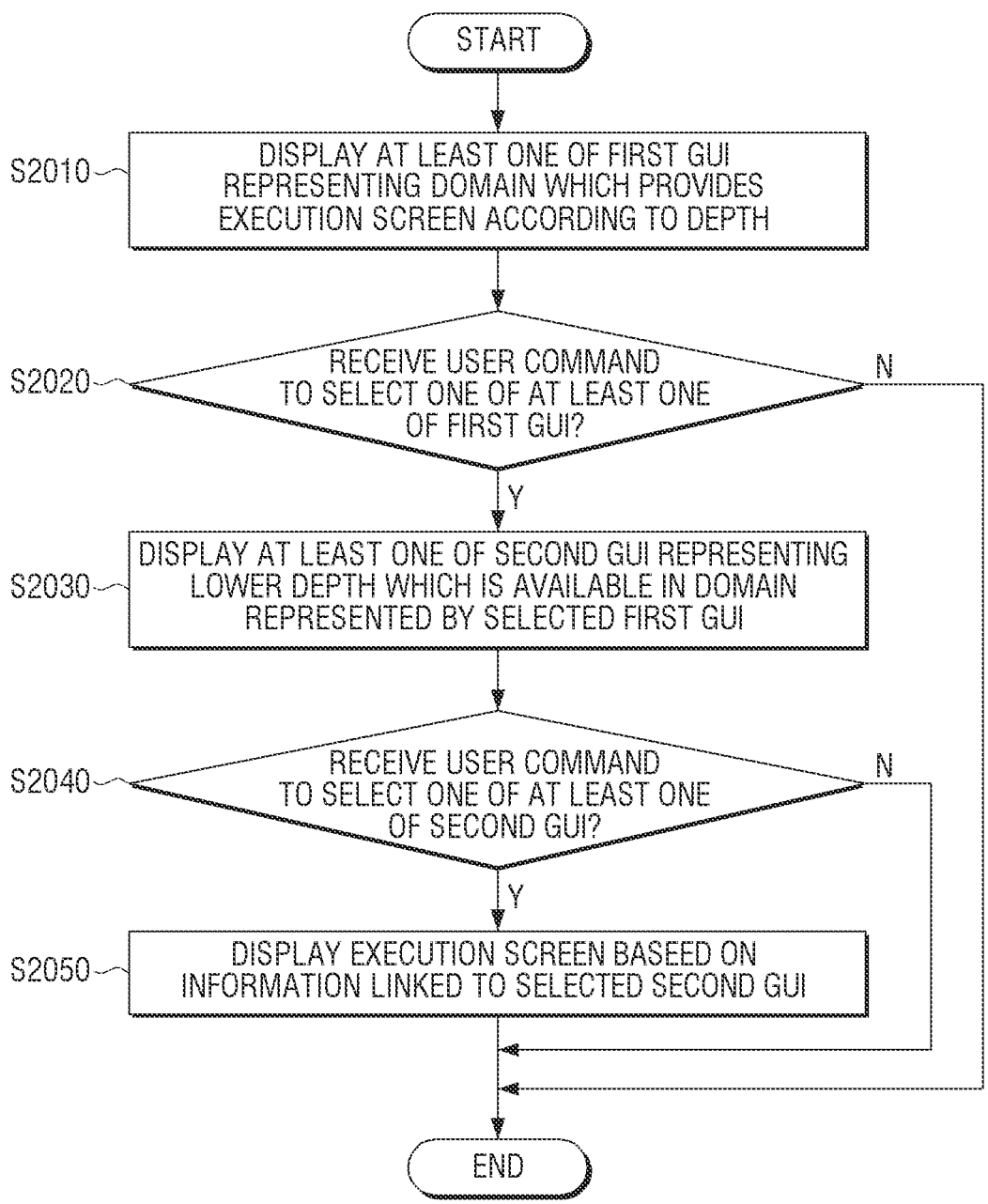
FIG. 20 is a flowchart provided to explain a method of controlling a display apparatus according to an embodiment of the present disclosure.

FIG. 20 is a flowchart provided to explain a method of controlling a display apparatus according to an embodiment of the present invention.

According to the method of controlling a display apparatus which is illustrated in FIG. 20, first of all, at least one of the first GUI representing a domain which provides an execution screen according to a depth is displayed at operation S2010. For example, when an application which provides a service according to an embodiment is operated, a UI screen including the first GUI may be provided.

Subsequently, if a user command to select one of the at least one of the first GUI is received at operation S2020:Y, at least one of the second GUI representing sub domains which are available in the domain represented by the selected first GUI is displayed at operation S2030.

Subsequently, if a user command to select one of the at least one of the second GUI is received at operation S2040: Y, an execution screen according to a sub domain may be provided based on sub domain information which is mapped with the selected second GUI at operation S2050.

Herein, the display apparatus stores information regarding a sub domain according to a depth provided by a domain in the form of tree structure, and the tree structure may include an anchor representing inclusion relations between a parent node corresponding to a domain, a plurality of child nodes representing each sub domain available in the domain, a parent node, and a plurality of child nodes.

In addition, the tree structure may be downloaded from outside, or generated or edited by a user manipulation.

Further, the domain which provides an execution screen according to a depth may include at least one of an application domain, a search domain, a web domain, and a user history domain.

The operation of displaying the first GUI may include displaying an input window on one area of the screen and displaying at least one of the first GUI on another area of the screen.

In this case, the operation of displaying the second GUI may include, if one of the at least one of the first GUI is selected and input to the input window, displaying at least one of the second GUI corresponding to the selected first GUI.

In addition, the operation of providing an execution screen may include, when the first GUI represents a upper search domain and the second GUI represents a lower search domain of the upper search domain, providing a screen showing the result of search which is performed in the lower search domain based on text information input to the input window after address information linked to the second GUI and the second GUI are selected.

In addition, the operation of providing an execution screen includes, when the first GUI represents an application domain and the second GUI represents a sub menu domain of the application domain, providing an execution screen corresponding to the sub menu domain represented by the selected second GUI based on parameter information which is mapped with the selected second GUI.

Further, the operation of providing the first GUI and the second GUI includes classifying domains representing at least one of at least one of the first GUI and at least one of the second GUI according to domain attributes, and grouping and providing GUIs having the same domain attributes together.

In addition, based on a user's usage history, a new domain may be provided by combining the first GUI and the second GUI which were selected by the user sequentially.

As described above, according to an embodiment, a user may be provided with a desired search result through a simple manipulation and thus, user convenience can be improved.

Meanwhile, the method of controlling a display apparatus according to various embodiments may be realized as a program, and the program may be provided to the display apparatus.

For example, a non-transitory readable medium storing a program for displaying at least one of the first GUI representing a domain which provides an execution screen according to a depth, when one of the at least one of the first GUI is selected according to a user command, displaying at least one of the second GUI representing a sub domain which is available in the domain represented by the selected first GUI, and when one of the at least one of the second GUI is selected, providing an execution screen according to a sub domain based on sub domain information which is mapped with the selected second GUI may be provided to a server.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as Compact Disc (CD), Digital Versatile Disc (DVD), hard disk, Blu-ray disk, USB, memory card, and ROM and provided therein The foregoing embodiments and advantages are merely exemplary and are not to be construed as limiting the present invention. The present teaching can be readily applied to other types of apparatuses. Also, the description of the various embodiments of the present disclosure concept is intended to be illustrative, and not to limit the scope of the claims, and many alternatives, modifications, and variations will be apparent to those skilled in the art.

While the present disclosure has been shown and described with reference to various embodiments thereof, it will be understood by those skilled in the art that various changes in form and details may be made therein without departing from the spirit and scope of the present disclosure as defined by the appended claims and their equivalents

What is claimed is:

1. A display apparatus, the apparatus comprising:
a display;
a user interface; and
at least one processor configured to:
control the display to display a first Graphic User Interface (GUI) of a first domain according to a first depth, the first domain providing an execution screen according to the first depth,
control the display to display, based on the first GUI being selected according to a user command received by the user interface, a second GUI of a sub domain of the first domain according to a second depth, wherein the second GUI of the sub domain is configured to be separately usable in a plurality of domains according to the first depth, and
control the display to display, if the second GUI is selected, an execution screen based on information which is mapped with the selected first and second GUI,
wherein the at least one processor is further configured to:
display an input window on one area of the display and display the first GUI on another area of the display,
display, based on the first GUI being selected and input to the input window, the second GUI corresponding to the selected first GUI, and
display, based on the second GUI being selected and input to the input window, a screen which is executed based on the input first GUI and the input second GUI,
wherein the selected second GUI is input near the input first GUI in the input window, and
wherein the first domain which provides the execution screen includes at least one of an application domain, a search domain, a web domain, or a history domain.

2. The apparatus as claimed in claim 1, further comprising:
at least one memory configured to store information regarding the sub domain according to a depth provided by the first domain in a form of a tree structure,
wherein the tree structure includes an anchor representing inclusion relations between a parent node corresponding to the first domain, a plurality of child nodes representing each sub domain which is used in the first domain, the parent node, and the plurality of child nodes.

3. The apparatus as claimed in claim 2, wherein the tree structure is downloaded, or generated and edited by a user manipulation.

4. The apparatus as claimed in claim 1, wherein the at least one processor is further configured to:
display, when the first GUI represents an upper search domain and the second GUI represents a lower search domain of the upper search domain, a screen of a result of a search which is performed in the lower search domain based on text information input to the input window after address information linked to the second GUI and the second GUI are selected.

5. The apparatus as claimed in claim 1, wherein the at least one processor is further configured to:
provide, when the first GUI represents an application domain and the second GUI represents a sub menu domain of the application domain, an execution screen corresponding to a sub menu domain represented by the selected second GUI based on parameter information which is mapped with the selected second GUI.

6. The apparatus as claimed in claim 1, wherein the at least one processor is further configured to:
classify domains representing at least one of the first GUI and the second GUI according to domain attributes, and group and provide GUIs representing domains having the same attributes.

7. The apparatus as claimed in claim 1, wherein the at least one processor is further configured to provide a new domain by combining the first GUI and the second GUI which are previously selected by a user sequentially based on a user's usage history.

8. A method of controlling a display apparatus, the method comprising:
displaying a first Graphic User Interface (GUI) of a first domain according to a first depth, the first domain providing an execution screen according to the first depth;
displaying, if the first GUI is selected according to the user command, a second GUI of a sub domain of the first domain according to a second depth, wherein the second GUI of the sub domain is configured to be separately usable in a plurality of domains according to the first depth;
displaying, if the second GUI is selected, an execution screen based on information which is mapped with the selected first and second GUI,
wherein the displaying the first GUI comprises:
displaying an input window on one area of a display and displaying the first GUI on another area of the display; and
display, based on the first GUI being selected and input to the input window, the second GUI corresponding to the selected first GUI,
wherein the displaying the second GUI comprises:
display, based on the second GUI being selected and input to the input window, a screen which is executed based on the input first GUI and the input second GUI,
wherein the selected second GUI is input near the input first GUI in the input window, and
wherein the first domain which provides the execution screen includes at least one of an application domain, a search domain, a web domain, or a history domain.

9. The method as claimed in claim 8, further comprising:
storing information regarding the sub domain according to a depth provided by the first domain in a form of a tree structure,
wherein the tree structure includes an anchor representing inclusion relations between a parent node corresponding to the first domain, a plurality of child nodes representing each sub domain which is used in the first domain, the parent node, and the plurality of child nodes.

10. The method as claimed in claim 9, wherein the tree structure is downloaded, or generated and edited by a user manipulation.

11. The method as claimed in claim 8, wherein the providing of the execution screen comprises:
displaying, when the first GUI represents an upper search domain and the second GUI represents a lower search domain of the upper search domain, a screen of a result of a search which is performed in the lower search domain based on text information input to the input window after address information linked to the second GUI and the second GUI are selected.

12. The method as claimed in claim 8, wherein the providing of the execution screen comprises:
providing, when the first GUI represents an application domain and the second GUI represents a sub menu domain of the application domain, an execution screen corresponding to a sub menu domain represented by the selected second GUI based on parameter information which is mapped with the selected second GUI.

13. The method as claimed in claim 8, wherein the providing of the first GUI and the second GUI comprises:
classifying domains representing at least one of the first GUI and the second GUI according to domain attributes, and
grouping and providing GUIs representing domains having the same attributes.

14. The method as claimed in claim 8, further comprising:
providing a new domain by combining the first GUI and the second GUI which are previously selected by a user sequentially based on the user's usage history.

15. A non-transitory computer-readable storage medium storing a program for controlling a display apparatus that, when executed, causes at least one processor to perform the method of claim 8.

* * * * *